(12) United States Patent
Subramanian

(10) Patent No.: US 8,205,530 B2
(45) Date of Patent: Jun. 26, 2012

(54) PROCESSES FOR IMPROVING TOOL LIFE AND SURFACE FINISH IN HIGH SPEED MACHINING

(76) Inventor: Sundaresa V. Subramanian, Hamilton (CA)

( * ) Notice: Subject to any disclaimer, the term of this patent is extended or adjusted under 35 U.S.C. 154(b) by 936 days.

(21) Appl. No.: 12/286,938

(22) Filed: Oct. 3, 2008

(65) Prior Publication Data

US 2010/0086369 A1    Apr. 8, 2010

(51) Int. Cl.
*B23Q 17/12* (2006.01)
*B23B 27/00* (2006.01)
(52) U.S. Cl. .......................................... 82/118; 82/1.11
(58) Field of Classification Search ................ 82/117, 82/118, 163, 904, 1.11; 408/143; 173/162.1; 409/141
See application file for complete search history.

(56) References Cited

U.S. PATENT DOCUMENTS

| | | | | |
|---|---|---|---|---|
| 2,748,298 | A * | 5/1956 | Calosi et al. | 310/26 |
| 3,739,665 | A * | 6/1973 | Kumabe et al. | 82/106 |
| 3,859,876 | A * | 1/1975 | Shimizu et al. | 82/158 |
| 4,567,797 | A * | 2/1986 | Folk | 83/56 |
| 4,646,595 | A * | 3/1987 | Slee | 82/118 |
| 4,911,044 | A * | 3/1990 | Mishiro et al. | 82/158 |
| 6,395,107 | B1 | 5/2002 | Subramanian et al. | |
| 6,537,395 | B2 * | 3/2003 | Subramanian | 148/543 |
| 6,637,303 | B2 | 10/2003 | Moriwaki et al. | |
| 6,776,563 | B2 * | 8/2004 | Shamoto et al. | 409/293 |
| 7,340,985 | B2 * | 3/2008 | Claesson et al. | 82/163 |

OTHER PUBLICATIONS

Brehl, D.E. and Low, T.A., "Review on vibration assisted machining," Precision Engineering 32, 2008, pp. 153-172.
Gleiter, H., "Nanostructured Materials: Basic concepts and microstructure," Acta Mater. 48, 2000, pp. 1-29.
Moriwaki, T. and Shamoto, E., "Ultraprecision diamond turning of stainless steel by applying ultrasonic vibration," Annals of CIRP, 1991, 40(1) 559-562.
Shamoto, E. and Moriwaki, T., "Study on elliptical vibration cutting," Annals of the CIRP, 1994, 43(1), 35-38.
Ackan, S., Shah, S., Moylan, S.P., Chhabra, P.N., Chnadersekar, S. and Yang, H.T.Y., et al., "Formation of white layers in steels by machining and their characteristics," Metallurgical and Materials Transactions, vol. 33A, Apr. 2002, pp. 1245-1254.
Yongbo, Xu, Zhang, J., Bai, Y. and Meyers, Marc, "Shear localization in Dynamic deformation: Microstructural evolution," metallurgical and materials transactions A, vol. 39A, Apr. 2008, pp. 811-843.

(Continued)

*Primary Examiner* — Will Fridie, Jr.
(74) *Attorney, Agent, or Firm* — Edwards Wildman Palmer LLP; Barry Kramer; Joshua L. Jones

(57) ABSTRACT

Processes for high speed machining of workpiece materials using high performance tools with prolonged tool life and improved surface finish are provided by vibrating the tool and/or the workpiece at a frequency greater than the frequency of shear localization in the primary shear zone or chip segmentation occurring in the absence of tool vibration, with an amplitude sufficient to break up the tool-chip atomic contact, thereby decreasing the tool-chip contact length through decreasing the tool-chip contact time, thereby suppressing accelerated chemical tool wear caused by dissolution of the tool into the workpiece by nanocrystalline grain boundary diffusion and grain boundary sliding mechanisms by preventing shear localization associated with nanocrystalline grain formation in the primary shear zone of the chip, and suppressing oxidation wear of the tool by preventing segmentation of the chip.

21 Claims, 19 Drawing Sheets

OTHER PUBLICATIONS

Schmutz, J., Brinkemeier, E. and Bischoff, E., "Sub-surface deformation in vibration cutting of copper," Journal of the International Societies for Precision Engineering and Nanotechnology, 25 (2001) pp. 218-223.

Subramanian, S.V. "Mechanism of accelerated chemical tool wear in high speed machining" Int. Conf. INTERCUT Oct. 22-23, 2008 Cluny, Burgundy, France, pp. 1-8.

Subramanian, S.V., et al., "Role of microstructural softening events in metal cutting," Machining Science and Technology, vol. 6, (2002), No. 3, pp. 353-364.

Subramanian, S.V., Gekonde, H.O., Zhu, G., Zhang X., Urlau U. and Roelofs, H. "Inclusion engineering of steel to prevent chemical tool wear," Ironmaking and Steelmaking, vol. 31, No. 3, pp. 249-257, 2004.

Subramanian, S.V., Zhu, G., Andrei, C.M., Ingle, S.S. and Zhang, X. "Design of steel for high speed machining" TMS publication—Proceedings of Sohn International Symposium, San Diego, Aug. 27-31, 2006, pp. 1-14.

Subramanian, S.V. and G. Zhu, "Quantitative modeling of chemical tool wear in metal cutting," Proc. of 7th CIRP workshop on modeling machining operations, May 4-5, 2004, ENSAM, Cluny, France, pp. 1-8.

Zhu, G., Subramanian, S.V. "Modeling the effect of dynamic softening of material on mechanics of metal cutting," 6th CIRP International Workshop Modeling of Machining Operations (2003), Hamilton, ON, Canada, pp. 1-12.

Ramanujachar, K. and Subramanian, S.V., "Micromechanisms of tool wear in machining fee cutting steels" Wear 197, 1996, pp. 45-55.

Subramanian, S.V., Gekonde, H.O., Zhang X. and Gao, J., "Design of steels for high speed machining," Journal of Ironmaking and Steelmaking, vol. 26, No. 5, 1999, pp. 333-338.

Subramanian, S.V., Ingle, S. S. and Kay, D.A.R., "Design of coatings to minimise tool crater wear," Surface and Coatings Technology, vol. 61 (1993), pp. 293-299.

Boothroyd G. and Knight, W.A., "Fundamentals of machining and machine tools," 3rd Edition, CRC Press, Taylor & Francis Group, 2006, pp. 506-509, Boca Raton, FL.

Shaw, Milton C., "Metal Cutting Principles" 2nd edition, Oxford University Press, 2005, pp. 428-431, New York, NY.

* cited by examiner

Fully segmented chip obtained at a cutting speed of 456 m/min and corresponding tool wear
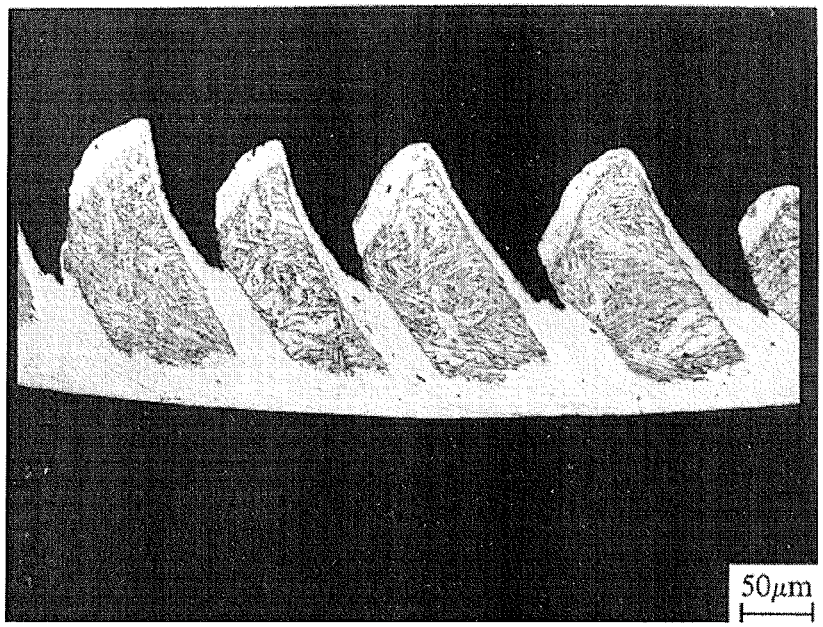
Fig. 6A A nearly fully segmented chip of hardened Fe-28.9Ni-0.1C alloy at a cutting speed of 456 m/min
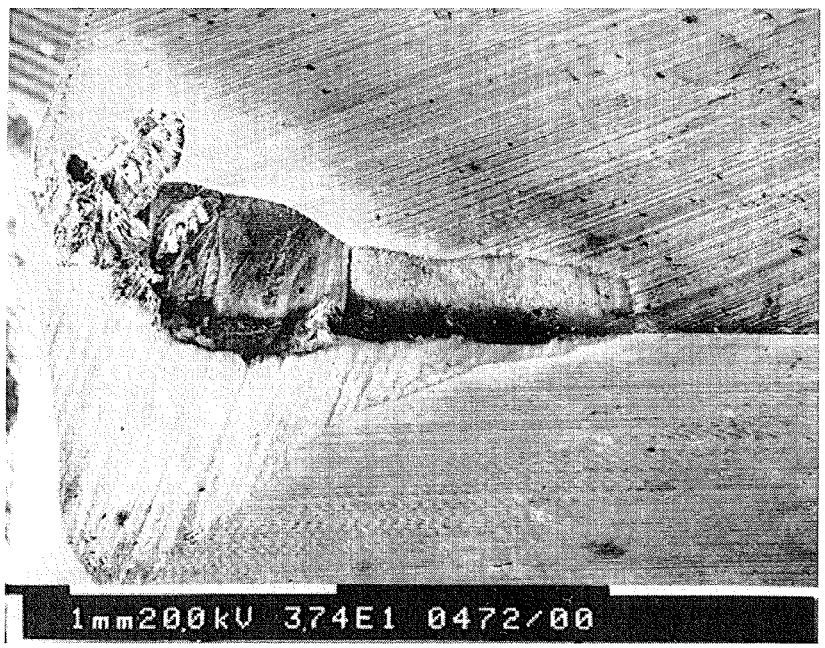
Fig. 6B Interaction of the primary shear zone at high temperature with cutting edge, resulting in loss of cutting edge of tool at 456 m/min.

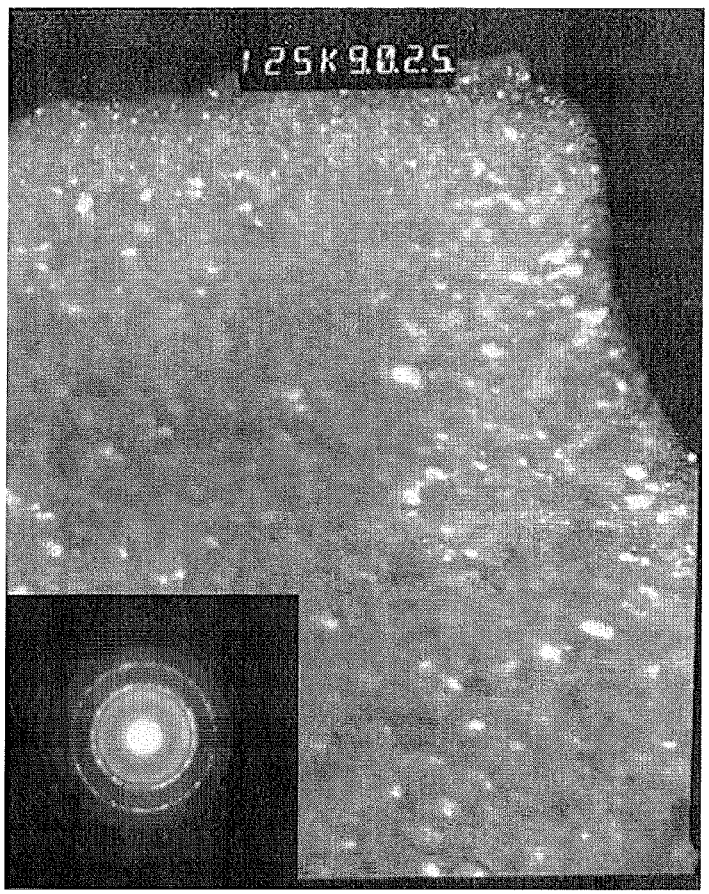
Fig. 6C Dark field image from TEM diffraction of shear localised region in the primary shear zone shown in Figure, exhibiting ultra-fine recrystallised grains of about 20 nanometer diameter. Each bright region is an individual crystallite.

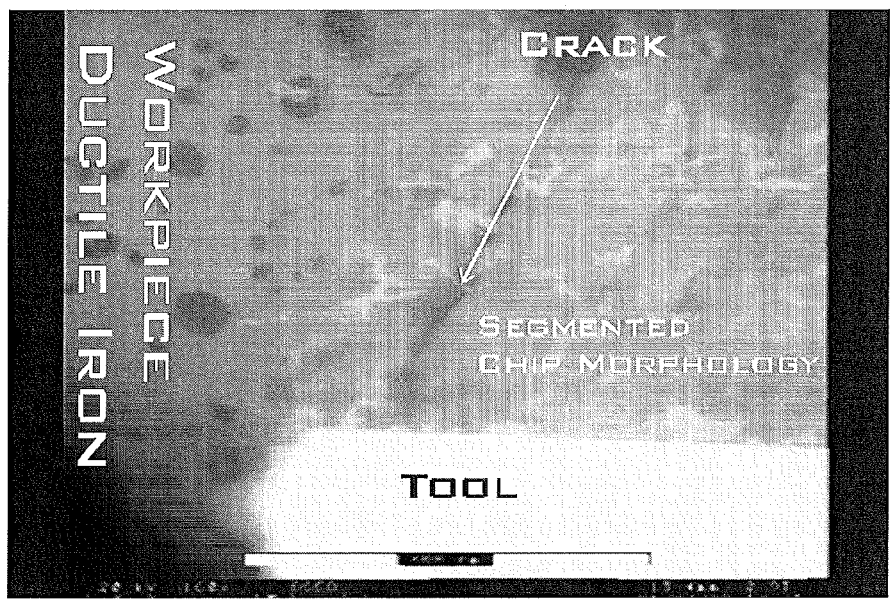
Fig. 11A - Early stage of crack formation in segmented chip morphology during cutting ductile iron

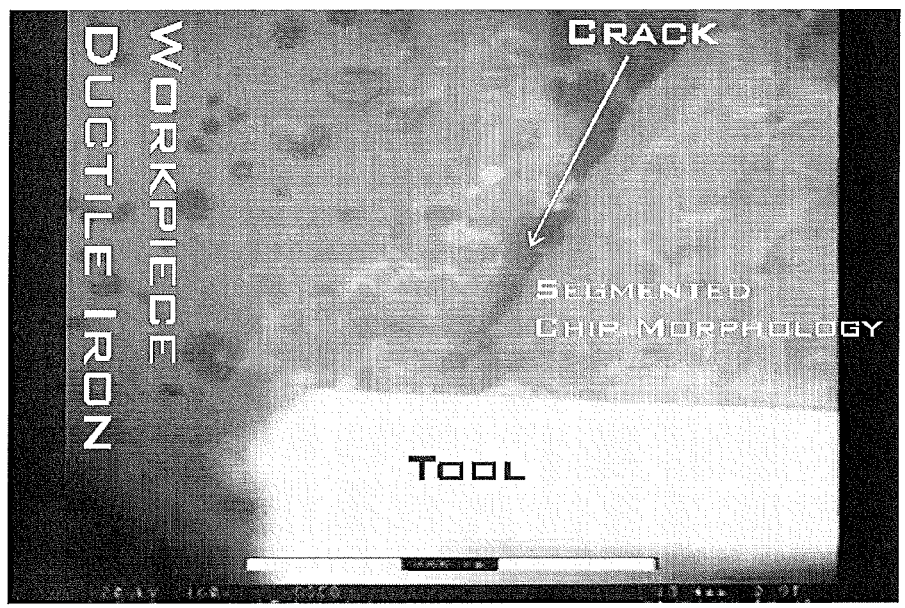
Fig. 11B - Progress of crack formation in segmented chip morphology during cutting ductile iron

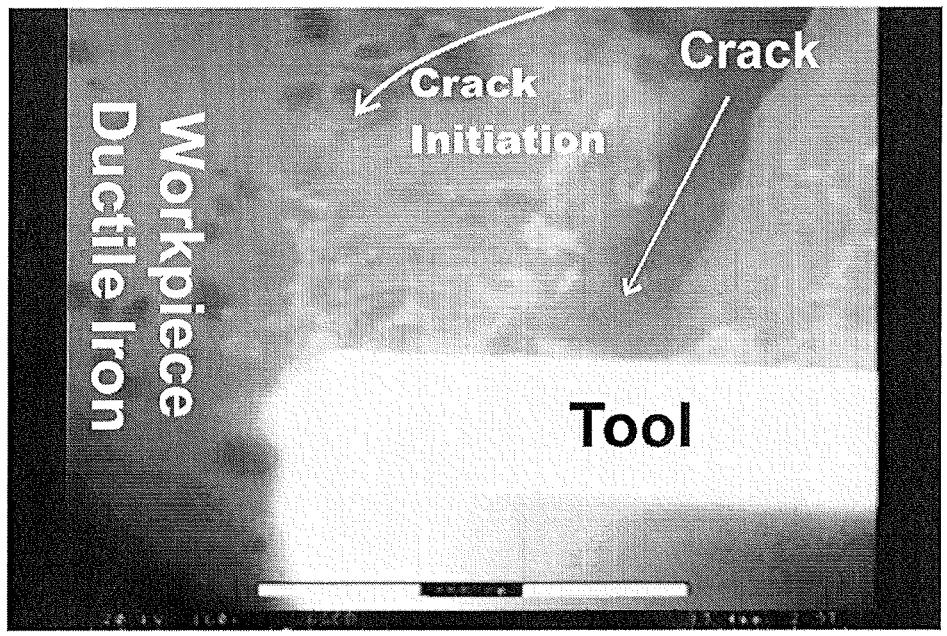
Fig. 11C - The end of crack formation in segmented chip morphology during cutting ductile iron. The beginning of incipient crack can also be seen.

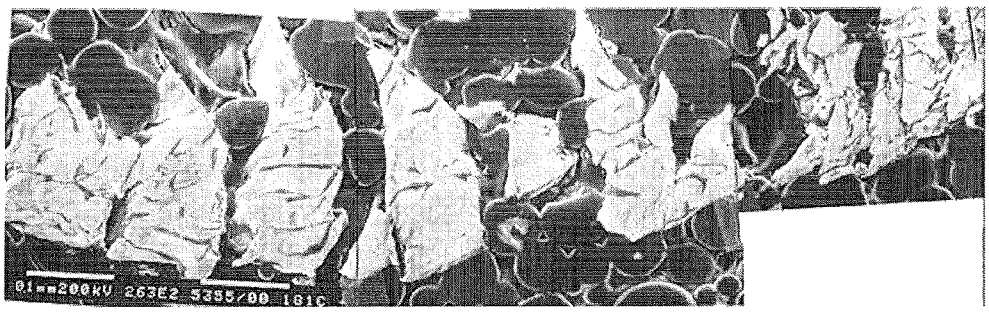
Fig. 12  Segmented chip generated during high speed finish machining of gray cast iron rotor using cubic boron nitride tool at a cutting speed of 7200 ft (2,194m) per min, feed 0.006 inch ( 0.15 mm) and depth of cut 0.02 inch( 0.5mm)

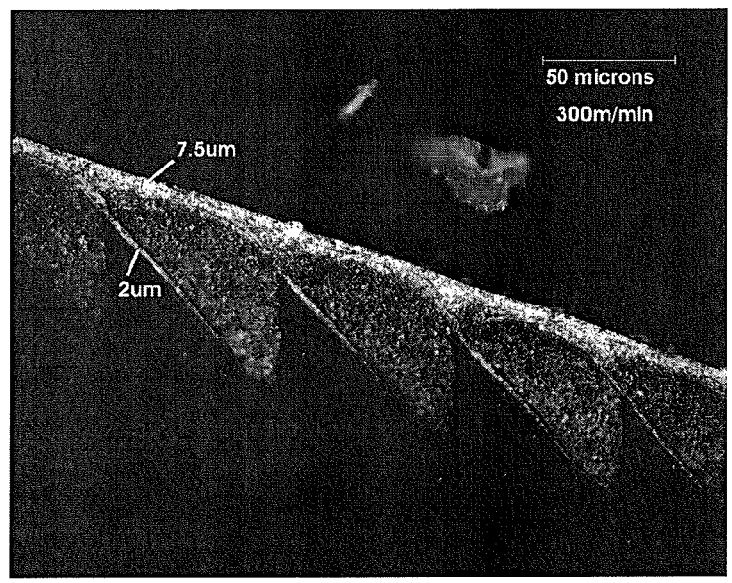
Fig. 13 Shear localised chip exhibiting characteristic white layer in the primary and secondary shear zone. The chip is generated by orthogonal cutting of hardened by AISI /SAE 4340 steel at a cutting speed of 300 m/min and a feed of 0.05mm

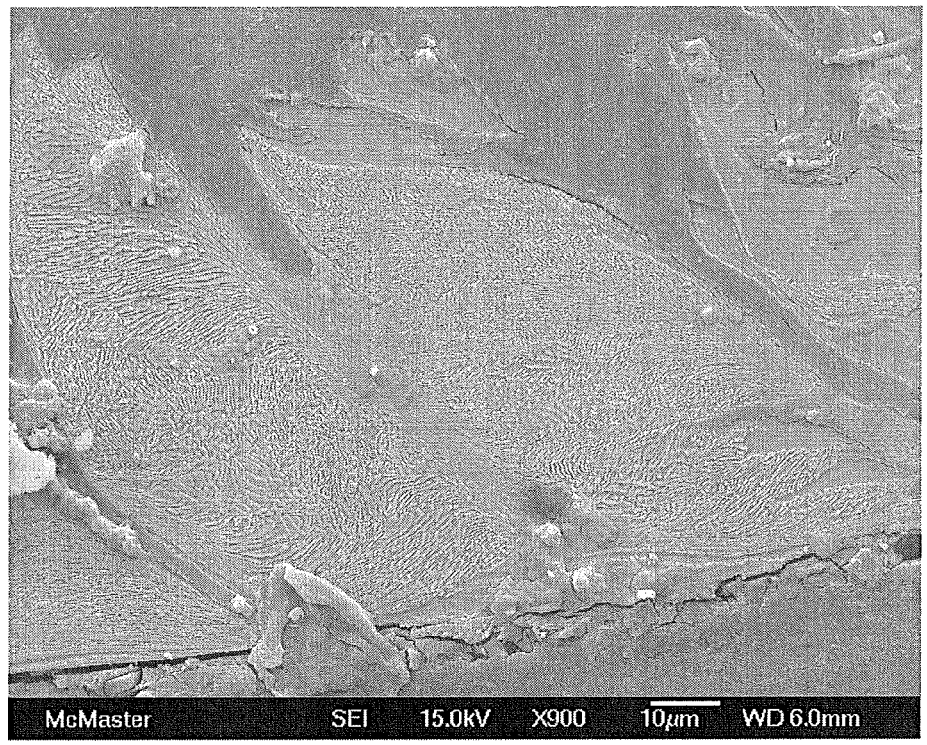
Fig. 14 SEM picture of CG iron chip, exhibiting shear localization. The chip is generated at a cutting speed of 800 m/min with a feed of 0.1 mm.

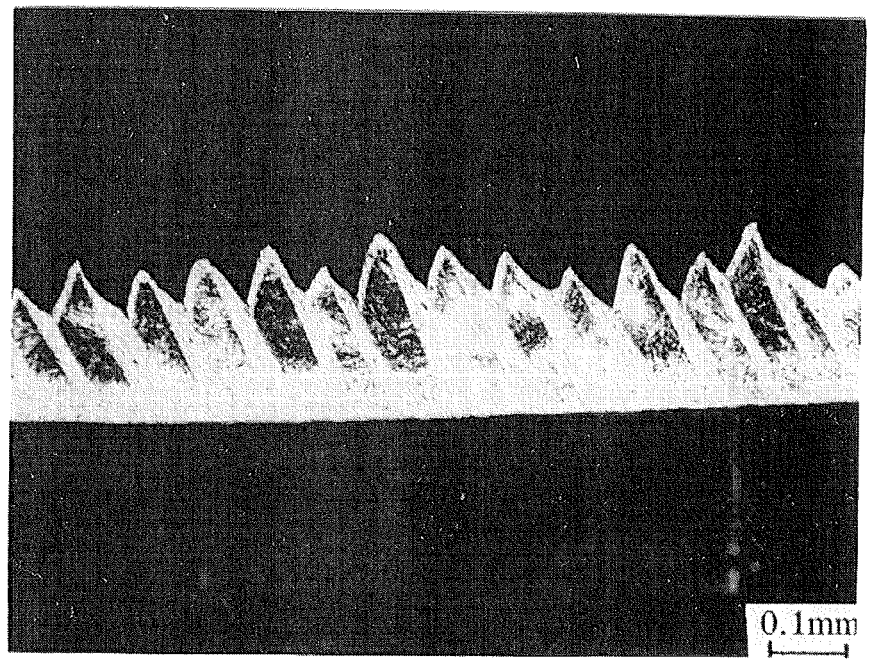
Fig. 15 is an optical micrograph of shear localized chip obtained in cutting hardened Fe-28,9%Ni- 0.1%C model alloy at a speed of 400 m/min and a feed of 0.1 mm.

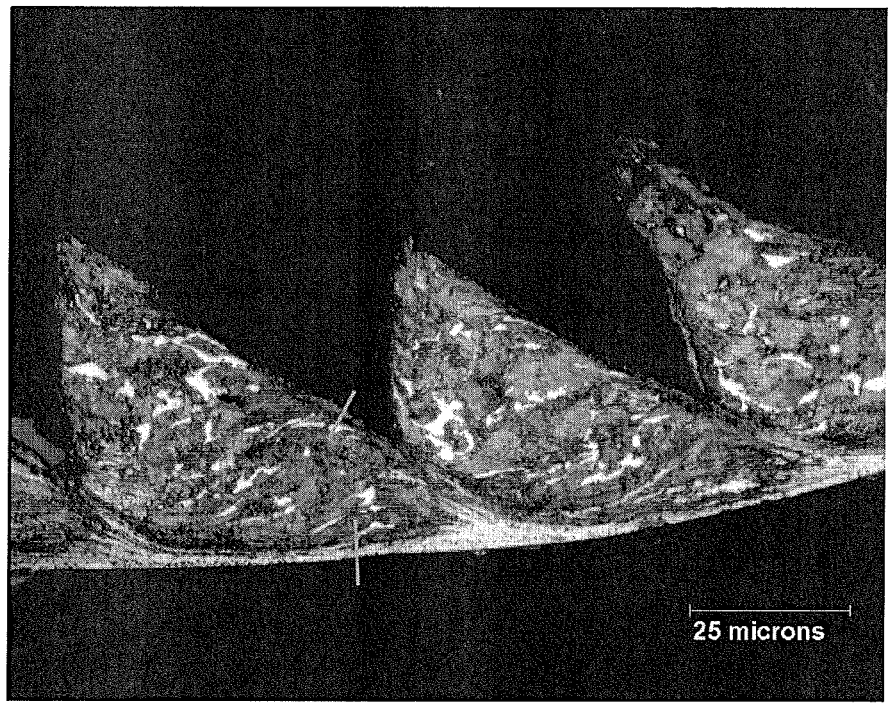
Fig. 16 Optical micrograph of austempered ductile iron chip generated at a cutting speed of 800 m/min and a feed of 0.05mm

PROCESSES FOR IMPROVING TOOL LIFE AND SURFACE FINISH IN HIGH SPEED MACHINING

FIELD OF INVENTION

This invention relates to processes for improving tool life of high performance tools made from hard materials such as polycrystalline cubic boron nitride, diamond, silicon nitride, Si—Al—O—N, tungsten carbide, as well as improving the surface finish of machined surfaces, by preventing the occurrence of nanocrystalline grain boundary diffusion and grain boundary sliding at the interface between the tool and the workpiece, which causes accelerated chemical dissolution tool wear, and segmentation of the chip, which gives rise to chemical tool wear by oxidation during finish machining at high speeds and low feed rates.

The localization of accelerated chemical wear at the cutting edge of the tool is caused by nanocrystalline grain formation due to shear localization in the primary shear zone, such shear localization can be suppressed through controlling the tribology at the tool-chip interface by vibrating the tool and/or workpiece to minimize the tool-chip atomic contact time and hence the tool-chip atomic contact length to prevent the onset of shear localization in the primary shear zone, with or without prior thermal softening of the workpiece. The prevention of segmentation of the chip can be effected by vibration of the tool and/or workpiece, which, in turn, suppresses chemical tool wear by an oxidation mechanism.

Vibration is normally considered undesirable in real life structures. The present invention establishes that vibration can be used to great benefit in high speed machining to prolong tool life by preventing chemical tool wear through prevention of shear localized chip morphology with characteristic nanocrystalline grain formation or segmentation of the chip.

BACKGROUND OF THE INVENTION

High speed machining of metals has generated great technological interest because it has the potential to offer excellent surface finish under dry machining conditions, increase productivity and decrease the cost. In finish turning operations, high speed coupled with low feed rates have been used successfully to achieve excellent surface finish so that a subsequent finish grinding operation is eliminated, resulting in substantial cost savings. Polycrystalline cubic boron nitride (PCBN) tools have been found to be the tools of choice for high speed machining because they exhibit diamond-like structure, high hardness and good thermal conductivity. For example, PCBN tools are successfully used at high speeds (>7,200 feet (2,194 m) per minute) and low feed rates (0.006' (0.15 mm) to achieve the excellent surface finish (Ra<1 micrometer) as required, for example, in cast iron brake rotors. The problem, however, which has plagued the growth of high speed machining of cast iron, is chemical wear of the tool occurring at the cutting edge caused by unknown variables in pearlitic iron castings which cause unpredictable tool life and poor surface finish.

My earlier patent (U.S. Pat. No. 6,537,395) directed to processes for producing gray cast iron was designed for improving tool life and surface finish in high speed machining with PCBN. That invention is based on the beneficial effects of engineering microalloying additions with strong affinity for nitrogen, carbon and oxygen in the work-piece materials in order to suppress dynamic strain aging during machining just-in-time (JIT) castings and to protect the PCBN cutting edge against oxidation by in-situ formation of chemically stable refractory oxides. The cast iron workpiece design with microalloying additions for improving tool life and surface finish in high speed machining with PCBN and silicon nitride tools is the subject of my related patent (U.S. Pat. No. 6,395,107 B1). The current technological trend in automotive companies is to outsource castings on a global basis. Further, compacted graphite cast iron has emerged just recently as a material of choice in the development of new engines that can withstand high firing pressure. Accelerated chemical tool wear at high cutting speeds, however, has proven to be a significant obstacle in the way of achieving the required line speeds for high productivity in automotive manufacturing of compacted graphite iron engine blocks. Thus, there is a significant incentive to develop additional solutions to combat chemical tool wear, which are based on a quantitative understanding of the mechanisms underlying accelerated chemical wear in high speed machining of metals.

The present invention is aimed at improving the tool life and surface finish while achieving improved productivity using high cutting speeds. Typical automotive applications use high cutting speeds of 5 to 35 m/s and low feeds of 0.05 to 0.15 mm, where the tribology at the tool-chip contact involves atomic contact or seizure and the chips exhibit shear localized or segmented morphology. In contrast, the prior art on vibration assisted machining (VAM) is confined to precision machining at very low cutting speeds of a few centimeters per second and exceedingly low feeds of a few micrometers; whereby excellent surface finish is obtained at very low productivity, and where the chip morphology is of the continuous flow type and the tribology at the tool-chip contact is sliding, involving asperity contact. Under these conditions, accelerated chemical tool wear is not an issue. But in high speed machining, accelerated chemical tool wear is the root cause of poor tool life. As the cutting speed is increased, the tribology of sliding occurring at low cutting speed changes over to seizure, involving atomic contact at the tool-chip interface at high cutting speeds. The chip morphology changes over from the flow type at low cutting speeds to shear localized chip with nanocrystalline grain formation in the shear localized region at high cutting speeds. In consequence, accelerated chemical wear is caused by rapid dissolution of tool into chip, by nanocrystalline grain boundary diffusion. In addition, the oxidation of the tool occurs when the cracks associated with segmentation of the chip exposes the tool to an oxidizing environment. According to the present invention, the tool is vibrated at a frequency exceeding the critical frequency of shear localization or segmentation of chip, characteristic of the dynamic behavior of the workpiece material under cutting conditions in order to suppress the formation of shear localized or segmented chip morphology, thereby preventing accelerated chemical tool wear.

Chemical wear is the dominant mechanism of tool failure in high speed machining. In the case of hardened steel, I have discovered that nanocrystalline grains form in the interfacial layer at the tool-chip contact, which causes accelerated dissolution of tool material into the chip or workpiece at the interface therebetween. In the case of cast iron with low strain to fracture compared to steel, oxidation of the tool can result in tool wear, which is caused by oxygen ingress through cracks associated with segmented chip morphology. According to the present invention, vibration of the tool is shown to be beneficial for prolonging the tool life under these conditions as well, provided the frequency of vibration of the tool is above the critical frequency of shear localization occurring in the primary shear zone of the chip as in the case of hardened steel or segmentation of the chip as in the case of cast iron. It is another object of this invention to provide methods which suppress the mechanisms that cause accelerated chemical tool wear.

A further object of this invention to provide processes which minimize chemical wear at the cutting edge of tools during high speed machining of metals.

Yet another object of this invention is to provide physical techniques rather than chemical composition modifications to prolong tool life.

SUMMARY OF THE INVENTION

The foregoing objects as well as other objects and advantages are accomplished by the present invention, which provides a process for preventing accelerated chemical wear occurring during high speed machining of metals with or without second phase particles in the hardened or unhardened condition. The second phase particles are typically localized at the cutting edge of a high performance tool and such tools are typically made from PCBN, silicon nitride and tungten carbide. The present invention teaches interrupting the atomic contact at the tool-chip interface before the onset of shear localization causing nanocrystalline grain formation in the primary shear zone in the cyclic process of shear localized chip formation or chip segmentation, by vibrating the tool with an adequate amplitude to break up the tool-chip atomic contact, and at a frequency greater than the frequency of shear localization or chip segmentation. The vibration under these above conditions reduces the tool-chip contact length sufficiently to suppress shear localization or chip segmentation in the primary shear zone. The frequency of shear localization or chip segmentation prior to vibration can be determined by either on-line monitoring sensors in the acoustic and ultrasonic range or measured metallographically, and the amplitude of said vibration to be sufficient to allow external lubrication, if desired. The instant process is based on the discovery that accelerated chemical wear is caused by dissolution of the tool into the chip through enhanced grain boundary diffusion of nanocrystalline grains occurring in the interfacial layer at the tool cutting edge-chip interface, which can be eliminated by preventing shear localization in the primary shear zone. Oxidation is the other competing mechanism of accelerated chemical tool wear, which is aided by oxygen ingress through cracks formed in chip segmentation process, which can be suppressed by preventing chip segmentation in the primary shear zone.

Shear localization in the primary shear zone occurs with a periodicity, resulting in shear localized chip morphology. Nanocrystalline grains are associated with shear localization in the primary shear zone. The layer containing nanocrystalline grains appear white, when viewed under an optical microscope. The nanocrystalline grains are below the resolution of an optical microscope and the scattering of white light by nanocrystalline grains causes the familiar white layer observed on shear localized chips. The white layer is non-etching and has undergone phase transformation during the high temperature excursion in metal cutting. However, if the temperature is not high enough to cause phase transformation, nanocrystalline grains would still occur in the deformation layer upon shear localization in the primary shear zone by dynamic recrystallisation, which is a major microstructural softening event. By preventing shear localization in the primary shear zone, the nanocrystalline grains associated with the white layer or deformation layer in the primary shear zone can be suppressed. Shear localization occurs with a periodicity, which comprises a stick and slip event. During the cycle of the stick-slip process, atomic contact is established at the tool-chip interface, and the atomic contact length increases until shear localization occurs at a critical contact length corresponding to a cycle time, which determines the critical frequency of shear localization or chip segmentation as the case may be. If the atomic contact can be broken by vibration of the tool to cause separation of the tool from the workpiece before critical contact length for shear localization or segmentation in the primary shear zone is reached, thereby suppressing the shear localization in the primary shear zone.

I have discovered that vibrating the tool at a frequency far greater than the frequency of shear localization can prevent shear localization in the primary shear zone. By controlling the atomic contact time and hence the atomic contact length at the tool-chip interface well below the critical values for shear localization, shear localization in the primary shear zone can be suppressed, thereby preventing the onset of shear localized chip morphology. Hence, accelerated chemical wear caused by nanocrystalline grain boundary diffusion in the white transformed layer or deformed layer associated with shear localization in the primary shear zone can be prevented.

If the metal matrix is dispersed with a large volume fraction of second phase particles, as is the case with cast iron, in which a large volume percentage of graphite (greater than 10%) is dispersed in the iron matrix, the incompatibility of deformation between graphite and the metal matrix causes the occurrence of void nucleation and void growth and void linkage, causing crack to set in at low strain in the primary shear zone, causing segmentation or fracture of the chip to occur, exposing the tool surface to air, thereby causing oxidation. I have discovered that the oxidation wear of the tool can be prevented by vibrating the tool at a frequency greater than the frequency of segmentation of the chip, thereby preventing segmentation of the chip.

At low cutting speeds and feeds, sliding tribology at the tool-chip contact is obtained, when asperity contact is established at the tool-chip interface. Flow chip morphology is obtained when sliding tribological conditions occur at the tool-chip interface. There is neither nanocrystalline grain formation nor accelerated chemical wear at such low speeds, when the sliding tribology operates at the tool-chip interface. At high cutting speeds characteristic of high speed machining, the asperities are believed to be squeezed to make atomic contact, tribological conditions of atomic contact or seizure occur, i.e., when the actual atomic contact area approaches the apparent contact area, enclosed by the contact length and the depth of cut. Thus this invention is based on the discovery that the atomic contact length can be controlled through controlling the tool-chip atomic contact time by vibration of the tool. By controlling the duration of atomic contact through vibration of the tool, it is possible to control the contact length. The effect of decreasing contact length by vibration of the tool is to decrease the chip thickness. A saw tooth chip morphology, which is devoid of any white layer formation due to shear localization in the primary shear zone is obtained by tool vibration, thus obviating the problem of accelerated chemical tool wear at the cutting edge. Further, the tribology of the tool-chip interface can be controlled with adequate external lubrication in the cycle time when the tool is not in atomic contact with the chip and in consequence, chemical tool wear at the tool-chip interface is minimized.

The present invention is directed, in part, to the substantive elimination of the localized chemical wear at the cutting edge of the tool occurring at the high cutting speeds and low feed rates characteristic of finish machining of metals, in the cast and wrought forms. The characterization of the structure of the white layer in the polished and etched layer of chips from metal cutting by transmission electron microscopy has revealed that the white layer is made up of nanocrystalline grains, which are beyond the resolution of an optical microscope. I have discovered that accelerated chemical tool wear is caused by enhanced diffusion of tool material into the nanocrystalline grain boundaries in the chip at the tool-chip contact. The diffusion of tool material into the chip in nanocrystalline grain boundaries occurs at seven to ten orders of magnitude (10 million to 10 billion times) faster than in the crystal lattice. By suppressing shear localization in the primary shear zone, the formation of the white layer or the deformation layer in the primary shear zone can be prevented, and hence accelerated chemical tool wear occurring at the cutting edge of the tool caused by nanocrystalline grain boundary diffusion can be suppressed.

Oxidation of the tool is the other competing mechanism but the source of oxygen remained unknown. I have now discovered that oxygen ingress to the cutting edge occurs through the cracks, when the chips are fully segmented. The solution to this problem lies in preventing segmentation of the chip in the primary shear zone. I have discovered that by vibrating the tool at a frequency greater that the critical frequency of chip segmentation, contact length can be decreased below the critical contact length for chip segmentation, thereby suppressing chip segmentation and hence accelerated chemical wear due to oxidation.

Thus, the present invention offers a novel solution to suppress accelerated chemical tool wear caused by the nanocrystalline grain boundary diffusion mechanism and/or oxidation mechanism occurring at high cutting speeds and low feeds by controlling the vibration frequency of the tool or the workpiece or both above the critical frequency of shear localization or chip segmentation in the primary shear zone. This novel method is applicable, even under conditions where the workpiece engineering or coating of the tool are not fully effective in suppressing accelerated chemical tool wear to ensure prolonged tool life to give consistently good surface finish.

The critical frequency of shear localization or chip segmentation is governed by the dynamic behavior of the workpiece microstructure under the deformation conditions of strain, strain rate, temperature and state of stress imposed by cutting speed, feed and geometry of the tool. The matrix hardening and volume fraction of second phase particles are important microstructural variables which influence the critical frequency of shear localization and/or chip segmentation frequency. Thus, in one aspect, the present invention lies in integrating workpiece microstructure parameters for the first time for on-line process control of frequency of vibrating the tool to prevent mechanisms contributing to accelerated chemical tool wear. By prior thermal softening of the matrix, matrix hardening and hence thermal softening potential of the workpiece is decreased, which, in turn, will decrease the critical frequency of shear localization in the primary shear zone. Thus, the frequency of vibration of the tool to prevent shear localization in the primary shear zone can be decreased by prior thermal softening of the workpiece by induction, laser heating techniques, or the like. This is a technological option in cases where the critical frequency of shear localization is large and is beyond the capability of vibrating the tool to achieve the required high frequency. By contrast, the frequency of vibration used in precision machining is relatively low, mostly around 20 kHz, which is well below the critical frequency of shear localization or chip segmentation in high speed machining.

BRIEF DESCRIPTION OF THE DRAWINGS

FIG. 3a exhibits waviness due to shear localization and FIG. 3b shows stick-slip features at the tool-chip contact with periodicity. The stick-slip wave length on the underside of the chip corresponds to the wave length of shear localized chip seen on the top.

FIG. 4 also illustrates the consequence of shear localization in chip on tool wear during metal cutting. Shear localization in the primary shear zone localizes the chemical wear at the cutting edge of the tool. Shear localization in the secondary shear zone caused by seizure or atomic contact at the tool-chip interface localizes the crater wear at some distance away from the cutting edge of the tool. This diagram illustrates that by preventing shear localization in the primary shear zone, localization of chemical tool wear at the cutting edge of the tool can be prevented. Preservation of the cutting tool against chemical wear is an essential condition for obtaining good surface finish.

Recent research has confirmed that the grain size of the interfacial layer at the tool-chip interface in metal cutting ranges typically from 10 to 100 nm.

Grain boundary volume of nanocrystalline grains under 30 nm is in the range of 10-20%.

Diffusion kinetics in nanocrystalline grain boundary is 100 million times faster than through the crystalline grain, i.e., $D_{ngb}=10^8 \times D_{lattice}$;

Solubility in the nanocrystalline grain boundary is typically $10^2$ to $10^3$ times greater than in the crystalline matrix.

The increase in volume fraction of nanocrystalline grain boundary, the enhanced diffusivity in nanocrystalline grain boundary and increase in solubility of tool material in the nanocrystalline grain boundary are the three factors that contribute to enhanced diffusion in nanocrystalline grain boundaries.

FIG. 6a is an optical micrograph of a shear localized chip obtained from cutting Fe-29% Ni-0.1% C alloy in the hardened (martensitic) condition exhibiting microstructural change (white region) associated with phase transformation (to austenite) due to shear localization in the primary and secondary shear zone. The chip was generated at a cutting speed of 456 m/min and feed of 0.256 mm (0.010") per rev.

FIG. 6b is a SEM picture of a cemented carbide tool showing localization of wear at the cutting edge of the tool. The nanocrystalline grain formed due to shear localization in the primary shear zone is the root cause of chemical wear at the cutting edge of the tool.

FIG. 6c shows a dark field image of the white layer in the primary shear zone exhibiting nanocrystalline grains in the primary shear zone of about 18 nm, with each bright region corresponding to an individual crystalline grain at a high magnification (150,000 times).

Figure 7A:
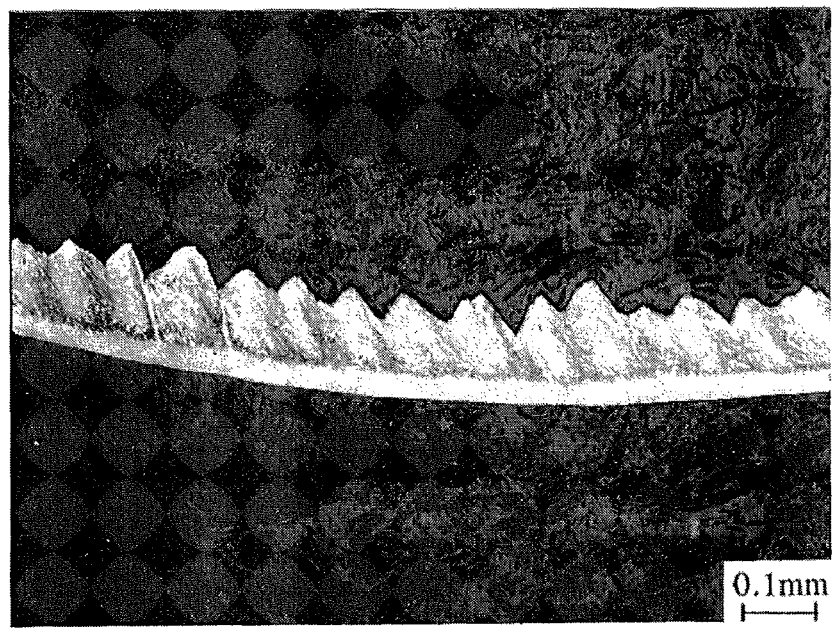
Figure 7B:
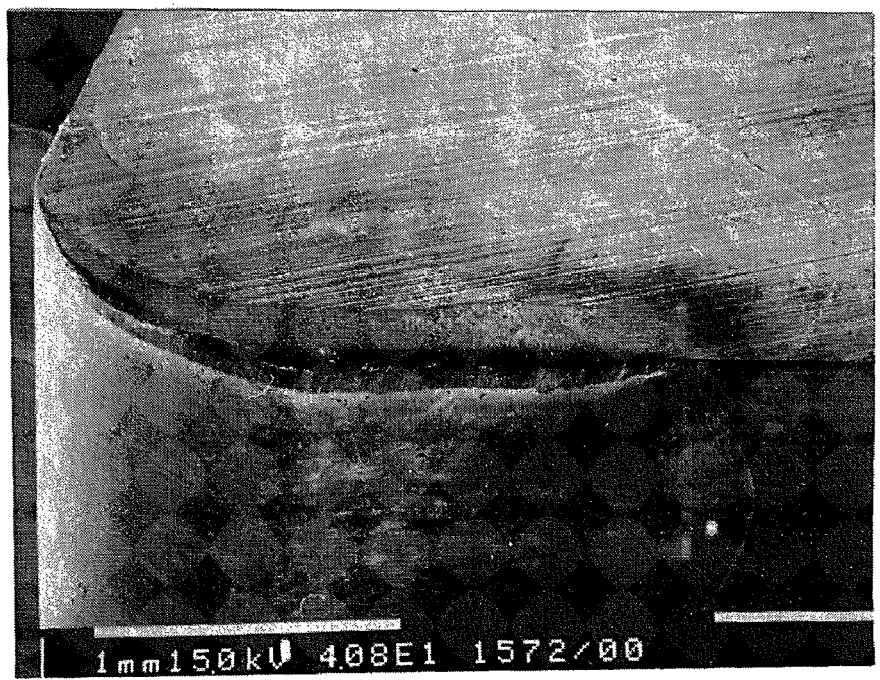

FIG. 7a is an optical micrograph of chip morphology exhibiting saw tooth type of chip morphology at a cutting speed of 350 m/min and a feed of 0.103 mm in a Fe-18.9% Ni-0.1% C. There is some evidence of onset of shear localization associated with white layer formation. The wavelength of shear localization is 0.075 mm. FIG. 7b is SEM picture showing the topography of corresponding tool wear, with crater located at some distance from the cutting edge.

Figure 8:
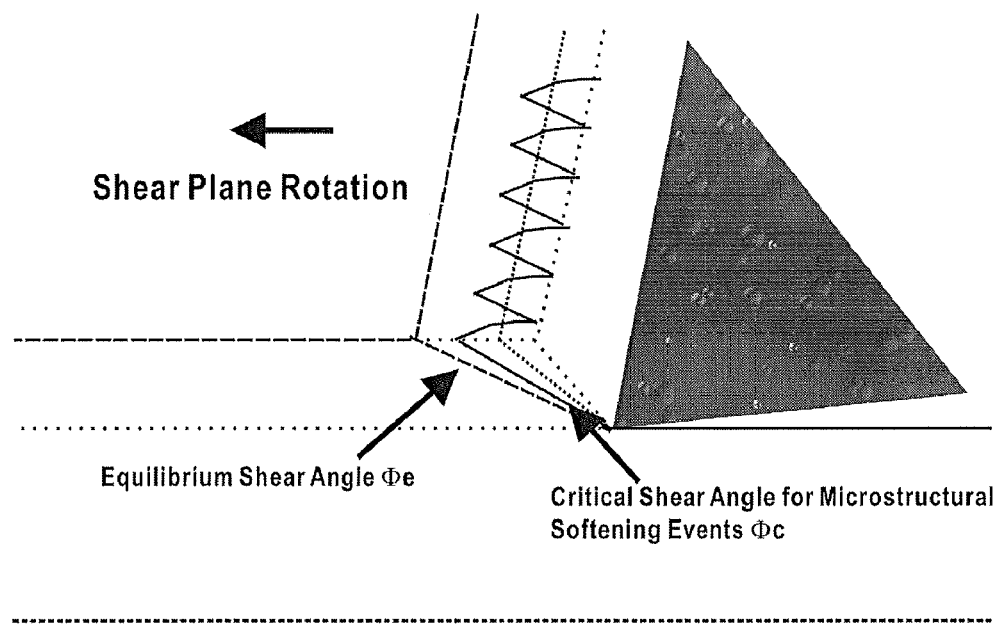

FIG. 8 is a schematic illustrating the concept of shear plane rotation for steady state flow chip morphology, the intervention of a major microstructural softening event during the shear plane rotation to cause the onset of non-steady state shear localized chip morphology, and the intervention of shear plane rotation by vibration of the tool well before onset of shear localization in the primary shear zone, thereby prevent shear localization in the primary shear zone.

Figure 9:
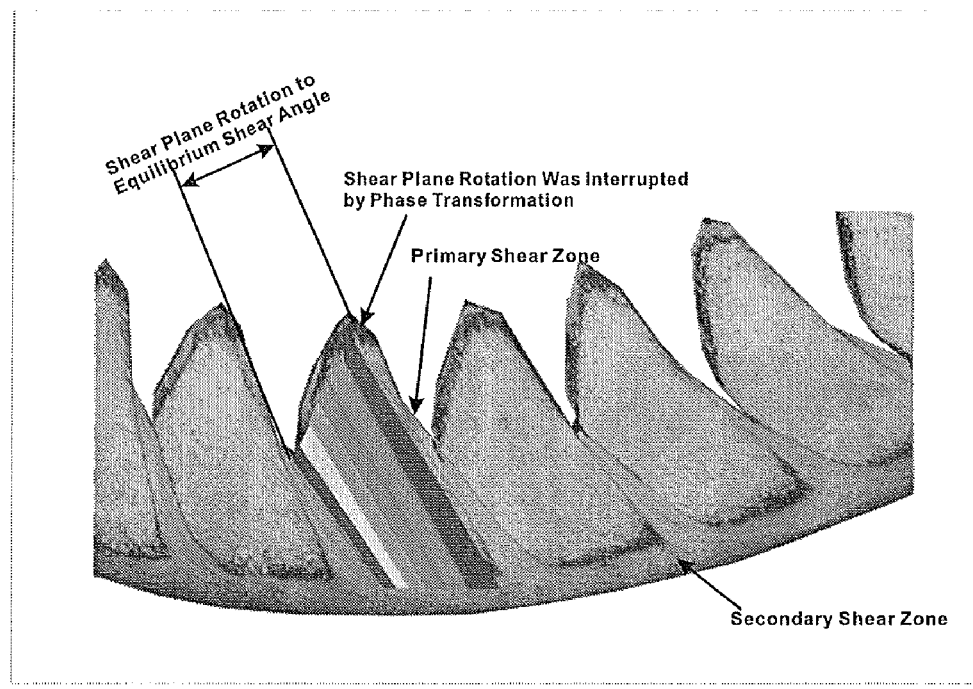

FIG. 9 is a typical shear localized chip morphology caused by shear localization due to phase transformation.

Figure 10:
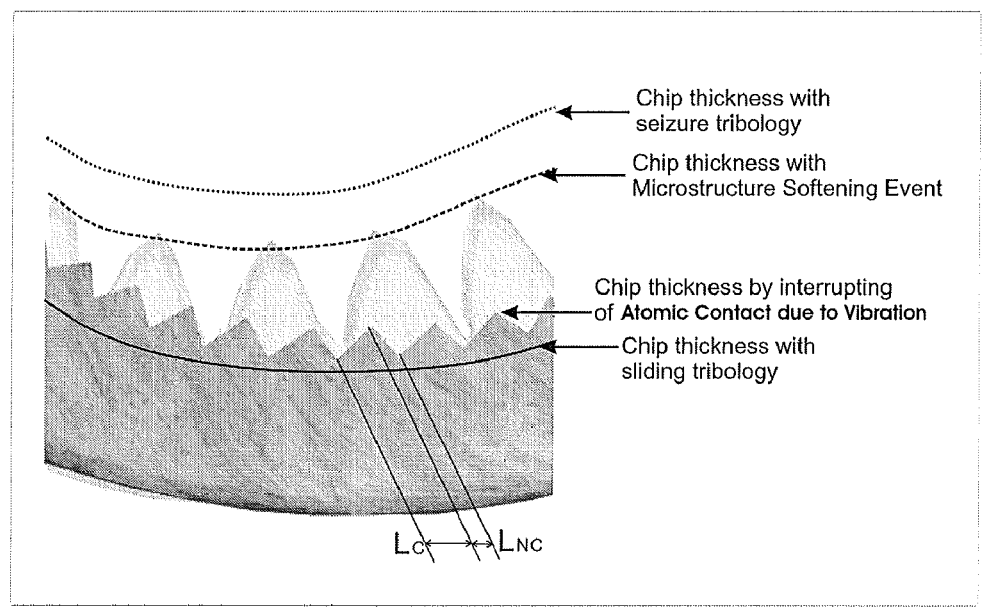

FIG. 10 is a schematic, showing the effect of vibration in reducing the chip thickness and increasing shear angle and preventing shear localization in primary shear zone.

FIG. 11a, FIG. 11b, and FIG. 11c are photographs taken in sequence from video images of segmented chip morphology evolution in cutting ductile iron viewed under Environmental Scanning Electron Microscope (ESEM). FIG. 11a shows the start of the crack initiation due to coalescence of voids initiated by incompatibility of deformation between graphite and iron matrix. In the underformed region of the workpiece, the spherulitic graphite nodules can be clearly seen. FIG. 11b is a photograph from ESEM video images taken after a time lapse from FIG. 11a. FIG. 11b shows the propagation of the crack from the free surface of the chip to the cutting edge of the tool. FIG. 11c is a photograph from ESEM video image at a later stage than FIG. 11b, which shows that the crack opening is complete, which allows full access of air to the cutting surface. The start of a new incipient crack can be also seen in FIG. 11c.

FIG. 12 is an optical micrograph of a polished section of a typical chip obtained in a high speed finish machining of gray cast iron at a high cutting speed of 7200 feet (2194 m) per minute and a feed rate of 0.006 inch (0.15 mm) per revolution. The chip, mounted in a Bakelite resin, shows fully segmented chip morphology. The dark long A-type graphite flakes are distributed randomly in the iron matrix that is pearlitic. Each segment exhibits an average contact length of 0.1 mm. The thickness of the chip segment increases from 0.17 mm to a maximum height of 0.275 mm before the full segmentation occurs.

FIG. 13 is an optical micrograph of a shear localized chip the exhibiting characteristic white layer in the primary and secondary shear zone. The chip is generated by orthogonal cutting of hardened AISI/SAE 4340 steel at a cutting speed of 300 m/min and a feed of 0.05 mm. TEM characterization of the white layer has confirmed the occurrence of nanocrystalline grains.

FIG. 14 is an SEM photograph of a polished and etched section of compacted graphite iron chip generated at a cutting speed of 800 m/min and a feed of 0.1 mm. Shear localization in the primary and secondary shear zones can be seen.

FIG. 15 is an optical micrograph of shear localized chip obtained at a feed of 0.1 mm and cutting speed of 400 m/min in hardened Fe-28.9% Ni-0.1% C alloy. The white layer is due to reverse martensite to austenite transformation, which occurs at 470° C. The occurrence of shear localization in the primary and secondary shear zones is aided by microstructural softening due to phase transformation.

FIG. 16 is an optical micrograph of shear localized chip obtained in cutting austempered ductile iron at a feed of 0.05 mm and cutting speed of 800 m/min. The graphite nodules are embedded in a hardened iron matrix. The chip exhibits shear localization in the primary and secondary shear zones.

DETAILED DESCRIPTION OF THE INVENTION

Figure 1A:
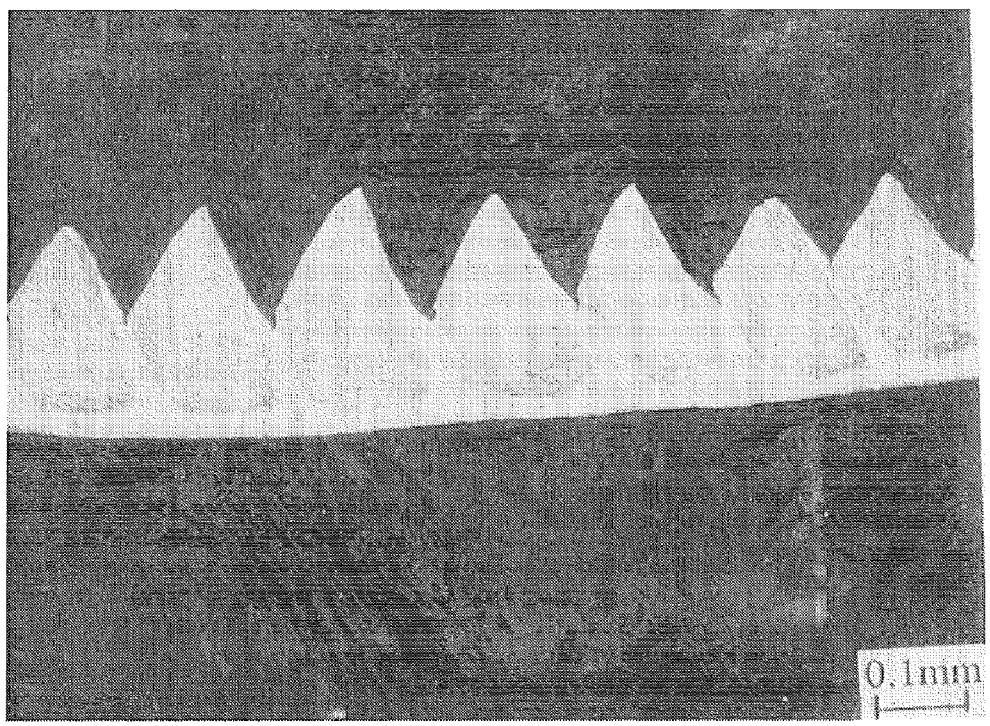
FIG. 1a is an optical micrograph of a shear localized chip obtained from cutting Fe-18.9% Ni-0.1% C alloy in the hardened (martensitic) condition at a cutting speed of 1148 feet (350 m) per minute and a large feed rate of 0.012" (0.305 mm) per revolution. The white regions have undergone phase transformation from martensite to austenite due to high temperature caused by shear localization in the primary and secondary shear zones.

FIG. 1a is an optical micrograph of a shear localized chip obtained from cutting Fe-18.9% Ni-0.1% C alloy in the hardened (martensitic) condition at a cutting speed of 1148 feet (350 m) per minute and a large feed rate of 0.012" (0.305 mm) per revolution. The microstructure exhibits features characteristic of inhomogeneous deformation caused by shear localization in the primary shear zone, as characterized by a transformation band. The transformation band is made up of nanocrystalline grains, which are beyond the resolution of an optical microscope, and scatter the incident white light and hence appear white under optical illumination. The white layer extends from the free surface to the cutting edge of the tool. The nanocrystalline grains in the white layer are associated with a large volume fraction of grain boundary, which is a high diffusivity path. Nanocrystalline grain boundary diffusion is the mechanism causing accelerated chemical wear, localized at the cutting edge of the tool.

Figure 3A:
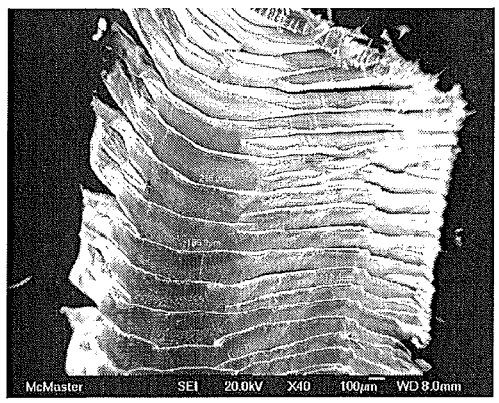
FIG. 3a and FIG. 3b are SEM photographs of the shear localized chip, shown in FIG. 1a, obtained from cutting Fe-18.9% Ni-0.1% C alloy in the hardened (martensitic) condition at a cutting speed of 1148 feet (350 m) per minute and a large feed rate of 0.012" (0.305 mm) per revolution, viewed from the top free surface and the underside of the chip, respectively.
Figure 3B:
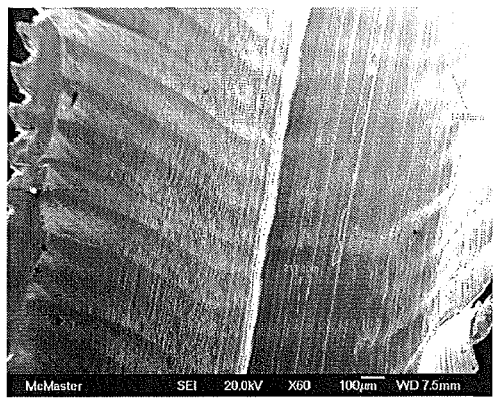

The examination of the underside of the chip on the SEM (scanning electron microscope) showed features characteristic of stick-slip events, see FIG. 3b. The wavelength of the stick-slip distance ranges from 145-215 micrometer, which corresponds to the wavelength of shear localization, as seen in FIG. 3a.

Figure 1B:
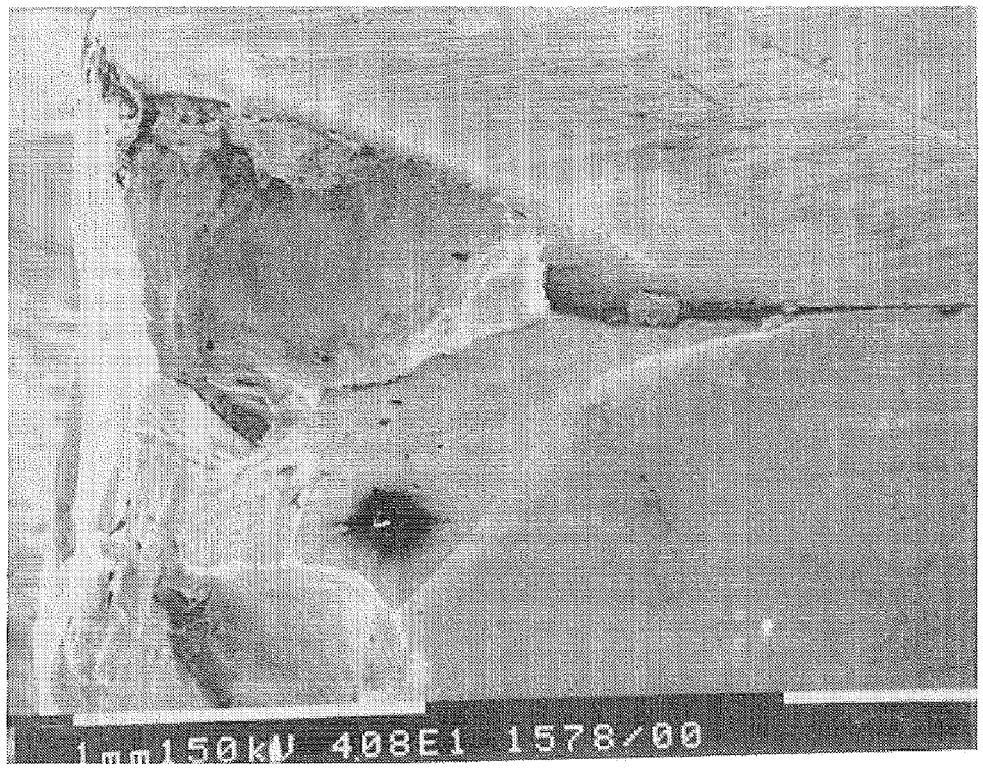
FIG. 1b is a SEM photograph of a cemented carbide tool showing localization of wear at the cutting edge of the tool after machining for 30 seconds at a cutting speed of 1148 feet (350 m) per minute and a large feed rate of 0.012" (0.305 mm) per revolution. The accelerated chemical wear is localized where the primary shear zone interacts with the cutting edge of the tool, causing the loss of cutting edge by chemical wear.

The stick region corresponds to the period when the tool is in atomic contact with the chip. The slip region corresponds to the period when the chip breaks away from atomic contact with the tool. During the stick period, the shear plane rotates, the shear angle decreases, the chip thickness increases and the cutting force increases. In the absence of any microstructural softening in the primary shear zone, chip thickness progressively decreases during the slip period of the cycle, giving rise to saw tooth morphology. However, in the present case, shear localization in the primary shear zone is promoted by a microstructural softening event due to reverse phase transformation from martensite to austenite. Thus, the white layer is formed on the primary shear zone, extending from the free surface to the cutting edge of the tool. Transmission Electron Microscopic studies of the white layer in the primary shear zone have confirmed that it is made up of nanocrystalline grains, ranging from 20-100 nm. Solute diffusion through nanocrystalline grain boundaries is orders of magnitude more rapid than through a crystalline matrix. The preferential solute diffusion along grain boundaries compared to diffusion within the crystal grains is analogous to rapid heat flow along copper plate that is enveloping an insulating material like cork. The rapid heat flow along the copper plate is analogous to high diffusivity of solute along grain boundaries. The relatively slow heat flow along the insulating cork is analogous to the slow diffusivity of solute atoms into the crystalline grains. Thus, severe loss of the cutting edge of the tool as seen on the SEM picture in FIG. 1b is primarily caused by dissolution of tool material into the chip due to the nanocrystalline grain boundary diffusion in the white layer occurring in the primary shear zone.

Figure 2A:
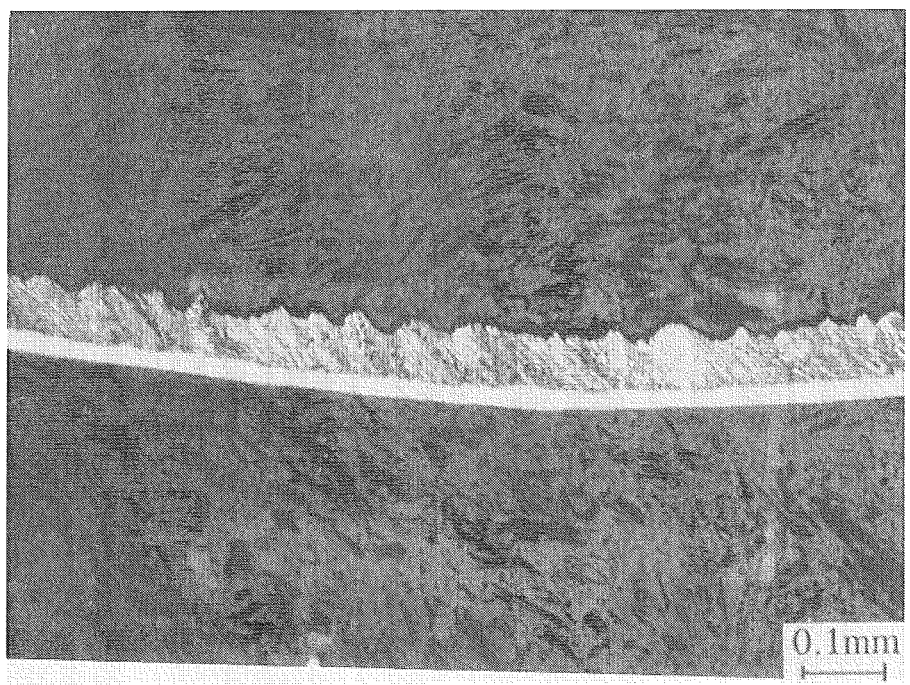
FIG. 2a is an optical micrograph of a shear localized chip obtained from cutting Fe-18.9% Ni-0.1% C alloy in the hardened (martensitic) condition at a cutting speed of 1148 feet (350 m) per minute and a low feed rate of 0.0021" (0.055 mm) per revolution. The white regions have undergone phase transformation from martensite to austenite due to high temperature caused by shear localization in the secondary shear zone at the tool-chip interface. The effect of decreasing the feed is to suppress shear localization in the primary shear zone. The effect of decreasing the feed is to decrease the length of chip in atomic contact with the tool and the time to reach maximum atomic contact length in the chip required for the occurrence of shear localization in the primary shear zone.
Figure 2B:
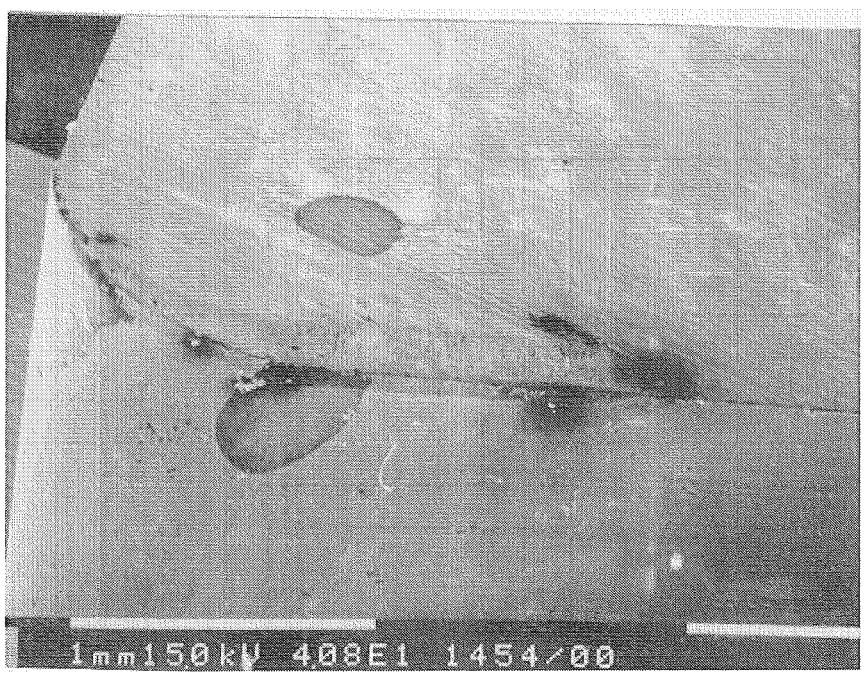
FIG. 2b is a SEM picture of a cemented carbide tool showing tool crater wear located at some distance away from the cutting edge of the tool after machining for 30 seconds at a cutting speed of 1148 feet (350 m) per minute and a feed rate of 0.0021" (0.055 mm) per revolution. Though crater wear occurs at some distance away from the cutting edge, the absence of shear localization in the primary shear zone has effectively prevented the loss of cutting edge of the tool by chemical wear.

FIG. 2a is an optical micrograph of a shear localized chip obtained from cutting Fe-18.9% Ni-0.1% C alloy in the hardened (martensitic) condition at a cutting speed of 1148 feet (350 m) per minute and a low feed rate of 0.0021" (0.055 mm) per revolution. The white regions have undergone phase transformation from martensite to austenite due to high temperature caused by shear localization in the secondary shear zone at the tool-chip interface. The chip exhibits saw tooth morphology, without any white layer formation on the primary shear zone. Thus, by decreasing the feed, the contact length is decreased and consequently, shear localization in the primary shear zone is suppressed. FIG. 2b shows that the wear is confined to the crater region and not localized at the cutting edge of the tool.

Figure 3C:
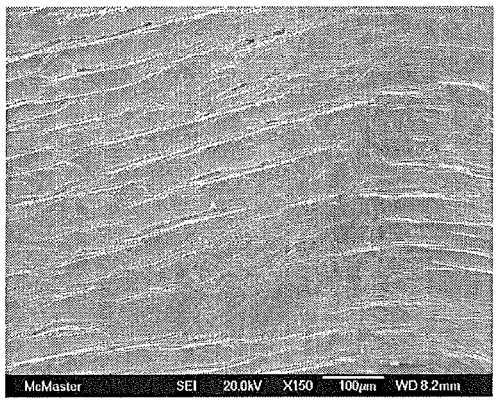
FIG. 3c and FIG. 3d are SEM photographs of the shear localized chip, shown in FIG. 2a, obtained from cutting Fe-18.9% Ni-0.1% C alloy in the hardened (martensitic) condition at a cutting speed of 1148 feet (350 m) per minute and a low feed rate of 0.0021" (0.055 mm), viewed from the top free surface and the underside of the chip. The chip does not exhibit features of shear localized chip morphology on the free surface of the chip, and stick-slip features on the underside of the chip at the tool-chip contact side.
Figure 3D:
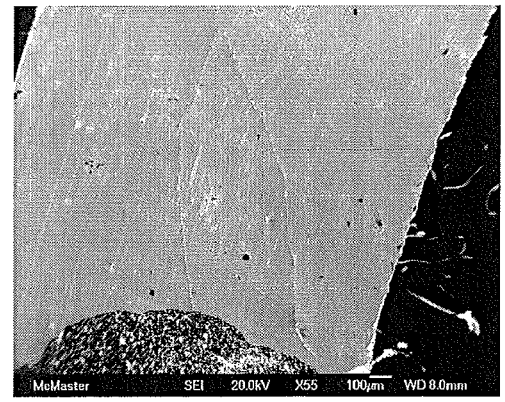

The free surface of the chip was examined on SEM (Scanning Electron Microscope) to observe topographical features associated with segmentation of the chip. FIG. 3a shows serrations on the chip surface corresponding to large feed. By comparison chip with low feed seen in FIG. 3c exhibits no serrations. The underside of the chip was examined in order to compare features characteristic of stick-slip event. Again, stick-slip features are clearly seen in FIG. 3b corresponding to large feed, which correlates with serrations observed on the free surface of the chip due to shear localization in the primary shear zone. The underside of the chip in FIG. 3d corresponding to low feed did not show any clear evidence of stick-slip features. The chip morphology clearly showed that the chip thickness increases during the stick period and decreases progressively during the slip period, giving the saw tooth profile. During the stick period, the shear plane rotates to a maximum chip thickness and then decreases during the slip period, in the absence of shear localization, due to any major microstructural softening event, like phase transformation or dynamic recrystallisation. In the absence of shear localization in the primary shear zone and the nanocrystalline grain formation due to shear localization in the primary shear zone, accelerated chemical tool wear due to nanocrystalline grain boundary diffusion at the tool-chip interface, where the primary shear zone interacts with the cutting edge of the tool, is avoided. While the effect of feed variation on temperature and pressure in the primary and secondary shear zones has been the subject of prior investigations, little attention has been paid to investigate the effect of atomic contact length on the origin of nanocrystalline grains in the primary and secondary shear zones and the consequence thereof on accelerated chemical tool wear. Extensive investigations on the microstructure and nanostructure of shear localized regions in the chip were carried out as a function of atomic contact length of chip, which led to the discovery underpinning the current invention that by reducing atomic contact length through interrupting the tool-chip contact by vibration of the tool during the stick period as effected by a low feed, shear localization in the primary shear zone can be averted and hence accelerated chemical tool wear at the cutting edge of the tool caused by nanocrystalline grain boundary diffusion associated with shear localization in the primary shear zone can be prevented.

Figure 4:
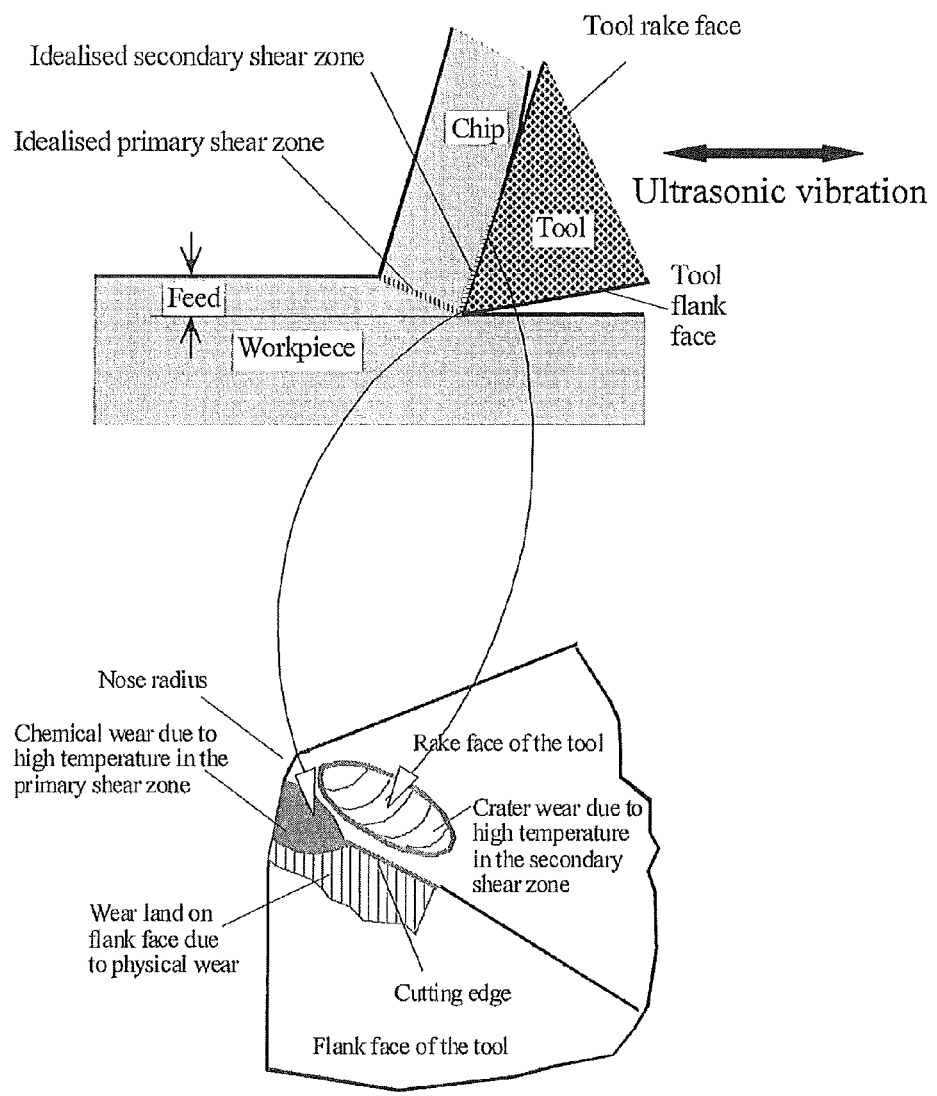
FIG. 4 is a schematic representation of the primary and secondary shear zones, occurring in the chip during metal cutting.

FIG. 4 is a schematic representation of the primary and secondary shear zones, occurring in a chip during metal cutting. FIG. 4 also illustrates the consequence of shear localization in a chip on the tool during metal cutting. Shear localization in the primary shear zone localizes the chemical wear at the cutting edge of the tool. Shear localization in the secondary shear zone caused by seizure or atomic contact at the tool-chip interface localizes the crater wear at some distance from the cutting edge of the tool.

Accelerated chemical tool wear is caused by enhanced nanocrystalline grain boundary diffusion of tool material into the chip. Nanocrystalline grains are formed, when the strain, strain rate and temperature exceed critical values for dynamic recrystallisation. Nanocrystalline grains are formed by a continuous dynamic recrystallisation mechanism, when critical strain and critical strain rate are reached upon shear localization. Since the present invention is based on preventing accelerated chemical wear by suppressing nanocrystalline grain formation, the underlying mechanisms of nanocrystalline grain formation, and nanocrystalline grain boundary diffusion in shear localized region of chip in metal cutting are discussed below in more detail.

High diffusivity paths associated with nanocrystalline grain boundaries are the principal sources of accelerated chemical wear. Once a nanocrystalline layer is formed in the interfacial layer at the tool-chip interface, the nanocrystalline grain boundary provides high diffusivity paths. In metal cutting, the grain size in the shear localized region at the interfacial layer ranges typically from 10 to 100 nm.

Figure 5:
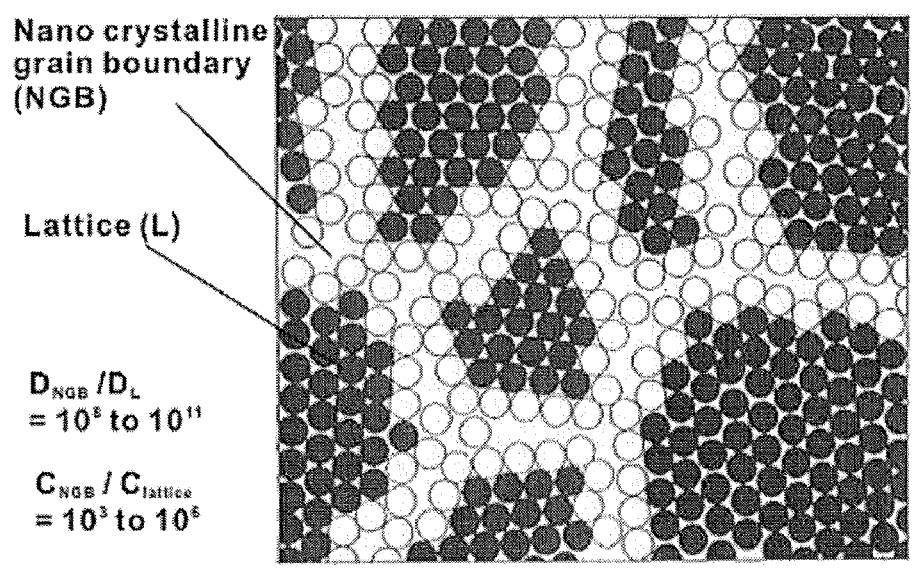
FIG. 5 is a two dimensional model of a nano-structured material. The atoms in the centers of the crystals are indicated in black. The atoms in the boundary core regions are represented as open circles (See, H. Gleiter, "Nanostructural Materials: Basic Concepts and Microstructure," Acta Mater. 48, (2000) 1-29). Grain boundary exhibits vacancies or point defects, which provide high diffusivity paths.

FIG. 5 is a two-dimensional model of a nano-structured material (see, H. Gliter, supra). The atoms in the centers of the crystals are indicated in black. The atoms in the boundary core regions are represented as open circles. Grain boundaries exhibit vacancies or point defects, which provide high diffusivity paths. Grain boundary diffusion of polycrystalline material is estimated to be seven orders of magnitude greater than in a crystal lattice. It is estimated that grain boundary diffusion in nanocrystalline grain boundaries is even greater, i.e., from eight to ten orders of magnitude greater than in a crystal lattice. The "equilibrium" solubility in the nanocrystalline grain boundary is $10^2$ to $10^3$ greater than in the lattice. Diffusivity is $10^8$ to $10^{10}$ times greater than in the lattice. The volume fraction of the grain boundary is as much as 30% as the grain size tends to 10 nm.

There are three important parameters that govern accelerated diffusion in nanocrystalline material. These are: (i) a large volume percent of grain boundary, which is determined by the grain size, (ii) large solubility in the grain boundary, which determines the interfacial concentration to set up a large concentration gradient for diffusion, and (iii) high diffusivity in the nano-crystalline grain boundary. Thus accelerated chemical tool wear is caused by nanocrystalline grain boundary diffusion.

FIG. 6a is an optical photograph of white layer formation in the chip at the tool-chip interface. Shear localized chip morphology is caused by shear localization in the primary shear zone, which is revealed by the white layer formation in the primary shear zone. White layer formation occurs in the secondary shear zone at the tool-chip interface. Shear localization in the primary shear zone is coupled to shear localization in the secondary shear zone in shear localized chip morphology. The chip exhibits a white layer consisting of nanocrystalline grains in the secondary shear zone at the tool-chip interface and in the primary shear zone, which interacts with the cutting edge of the tool. In addition, the white layer consisting of naocrystalline grains is observed on the top surface of the chip, which corresponds to the white layer generated on the machined surface of the same workpiece from the previous run with the same tool. The white layer is due to interaction of tool flank wear land with the machined surface of the same workpiece.

FIG. 6b shows SEM picture of the tool wear corresponding to the chip shown in FIG. 6a. The loss of cutting edge of the tool is related to white layer formation in the primary shear zone of the chip, which interacts with the cutting edge of the tool.

FIG. 6c shows a dark field image of the white layer exhibiting nanocrystalline grains in the primary shear zone. The nanocrystalline grains in the primary shear zone is about 18 nm in size.

When the nanocrystalline grains are less than 30 nm, deformation is expected to occur by grain boundary sliding mechanism rather than dislocation motion within the nanocrystalline grain. Deformation by a grain boundary sliding mechanism will further enhance the accelerated chemical wear of the tool. Thus the prevention of nanocrystalline grain formation particularly under 30 nm is crucial for suppressing accelerated chemical tool wear. The origin of nano-crystalline layer formation is described herein respect to shear localization in metal cutting.

With the increase in cutting speed, the tribological conditions at the tool-chip interface change from sliding (asperity contact) to seizure (atomic contact). With the onset of atomic contact at the tool-chip interface, the onset of shear localization occurs when the flow stress decrease due to thermal softening of the deformed layer which overtakes the flow stress increase due to strain hardening. Once shear localization occurs, deformation is confined to a narrow region, in which the strain and strain rate increases by nearly two orders of magnitude. The adiabatic heat raises the temperature within the band of intense deformation to exceed the phase transformation temperature. Large strain, high strain rate deformation occurring under large normal pressure causes nanocrystalline grains to form by a continuous, dynamic recrystallisation mechanism. The layer of nanocrystalline grains in the layer in immediate contact with the tool are typically in the range 12-20 nm and are formed by a geometric dynamic recrystallisation mechanism. The adjoining layer consists of 40-70 nm grains, which are probably formed by a continuous dynamic recrystallisation mechanism involving progressive rotation of subgrains. The energy consumed in shear localized deformation in the secondary shear zone, causes the equilibrium shear angle to decrease, which causes the shear plane to rotate to a new equilibrium shear angle, with the local increase in chip thickness.

The shear angle is a free boundary problem, which decreases with the increase in energy consumed in the secondary shear zone. As the shear plane rotates to the new equilibrium shear angle, the critical condition for dynamic recrystallisation would occur if the critical strain, strain rate and temperature are met. Thus, a microstructural softening event due to dynamic recrystallisation would occur, giving rise to a shear localized chip morphology. Depending upon the temperature of phase transition, a white layer or a deformed layer will occur once dynamic recrystallisation causes nanocrystalline grains to form within the primary shear band. If a large volume of second particles is present, incompatibility of deformation between the matrix and second phase particles will cause void nucleation, void growth and void coalescence, causing crack initiation and crack propagation leading to chip segmentation. Thus, it is possible to cause chip segmentation before the onset of dynamic recrystallisation during deformation.

The dynamic behavior of metals as a workpiece material is not necessarily well behaved with respect to temperature, strain rate, and strain as captured in constitutive equations because microstructural softening events can occur abruptly at critical values of these parameters.

Phase transformation (involving crystal structure change), dynamic recrystallisation (involving strain free grains), and fracture are the three microstructural softening events that occur at critical values of temperature, temperature corrected strain rate and strain respectively occurring within the shear band.

This understanding forms the basis for physically based modeling to predict the onset of shear localized chip morphology in metal cutting. This led to the discovery that if the shear angle could be arrested before reaching the critical shear angle for occurrence of any microstructural softening event, shear localization in the primary shear zone can be prevented. Once shear localization in the primary shear zone is arrested, the occurrence of nanocrystalline grains associated with shear localized chip morphology and the consequent accelerated chemical wear at the cutting edge of the tool can be prevented.

FIG. 7a is an example of the onset of shear localization due to phase transformation in a chip machined at a cutting speed of 350 m/min and a feed of 0.103 mm in a Fe-18.9% Ni-0.1% C. The wavelength of shear localization is 0.075 mm. The chip thickness varies due to stick-slip events and hence the chip speed is not expected to be uniform. The chip flow velocity is less than the cutting speed, as the thickness of uncut chip (feed) is increased due to deformation process in metal cutting, reaches a maximum thickness of 1.8 mm before the onset of shear localization in this case, which reduces the instantaneous cutting velocity to about 250 m/min from 350 m/min. Thus the atomic contact time for shear localization is $1.8 \times 10^{-5}$ second, which corresponds to a critical frequency of shear localization of 55.5 kHz. For a target contact length of 0.05 mm at which shear localization in the primary shear zone is suppressed, the frequency of vibration required for an upper bound of chip cutting velocity is 91.66 kHz for average chip velocity of 275 m/min. This is a quantitative measure of critical frequency above which shear localization in the primary shear zone can be suppressed. If the tool-chip atomic contact length is decreased well below 0.05 mm, contact time reduced to $8.33 \times 10^{-6}$ second or the frequency of vibration is increased above 120 kHz, shear localization in the primary shear zone can be completely suppressed as shown in FIG. 2. In this example, shear localization in the primary shear zone can be suppressed by vibrating the tool at a frequency of 120 kHz, thus interrupting shear plane rotation well before the critical shear angle for phase transformation is reached. This potential benefit of high frequency vibration in suppressing shear localization in the primary shear zone and consequent accelerated chemical tool wear has not been recognized in any prior art. The focus of the prior art in vibration assisted machining (VAM) was on precision machining, which is limited to the use of a vibration frequency of less than 40 kHz in order to achieve excellent surface finish at low cutting speed and feed. The prior art on VAM is examined in further detail below in order to distinguish the present invention from the prior art.

The prior art in vibration-assisted machining (VAM) has been recently reviewed comprehensively by D. E. Brehl and T. A. Low "Review on Vibration Assisted Machining," Precision Engineering 32, 2008, pp. 153-172. Vibration-assisted machining (VAM) is an emerging technology that combines precision machining with small amplitude tool vibration to improve the fabrication process. VAM adds small amplitude high frequency tool displacement to the cutting motion of the tool. The tool tip is driven in a small reciprocating (1 Dimensional VAM) or elliptical motion (2 Dimensional VAM). For appropriate combinations of cutting velocity, tool amplitude and frequency, the tool periodically loses contact with the chip (or leaves the workpiece entirely, in the case of 2D VAM). The periodic separation between the tool rake face and uncut material, characteristic of VAM is related to the observed reductions in machining forces and chip thickness. The reduced forces are related to improvement in surface finish and extended tool life.

The current understanding of the fundamental processes is limited. The technology of VAM is developed primarily for precision machining on a number of materials ranging from difficult to machine materials like nickel based superalloys, cutting hardened steel with diamond tools, brittle materials like tungsten carbide and glass. The bulk of the prior work in VAM is limited to less than 40 kHz, most of it around 20 kHz, though the depth of cut has ranged from 2 to 100 µm, mostly around 15-20 µm. VAM technology is developed for precision machining where the cutting speeds and feeds are low. At such low cutting speeds and feeds, the tool-chip contact involves asperity contact and the tribology of sliding occurs at the tool-chip interface with frictional forces operating at the tool-chip contact. By contrast, at higher cutting speeds, rapid chemical wear occurs, which is caused by tribology of atomic contact at the tool-chip interface, involving the work of shear in the secondary shear zone in the chip at the tool-chip contact, resulting in nanocrystalline grain formation in the interfacial layer.

The peak instantaneous cutting and thrust forces in VAM at low cutting speeds and feeds characteristic of precision machining are the same as in the continuous cutting. However, the average cutting and thrust forces are brought down by reducing the actual cutting time when the tool is in contact with the workpiece to a fraction of the total cycle time for one tool vibration. For the rest of the time, the tool is separated from the workpiece. Mirror like surface finish was obtained by diamond cutting, when the cutting forces were kept low. In order to reduce the cutting forces, the upfeed cutting speed is operated at a fraction of the velocity of vibration of the tool.

Deformation processes in VAM were seen to be localized to the region of cutting edge/chip and were not evident in the newly cut surface beneath the flank face. In conventional cutting without vibration, the deformation damages penetrates to a greater depth. Tool tip temperatures as measured by infra-red thermography showed that the tool tip temperatures were 15% higher for VAM than conventional machining, though this finding came as a surprise. However, the periodic cooling occurs following the cutting in VAM, when the tool is separated from the workpiece. This is considered to be beneficial in reducing thermo-chemical wear. According to Moriwaki et al., U.S. Pat. No. 6,637,303, directed to on elliptical vibration cutting methods and elliptical vibration apparatus, the intermittent cutting provides a cooling time for the cutting tool, thereby enabling an ultra-precise cutting of a ferrous material with a diamond tool. During 2D VAM machining following the tool path design by Moriwaki et al., thrust force reverse for part of each cutting cycle, which is attributed to a change in the friction on the rake face of the tool. This is claimed to assist the chip motion, thus causing significant reduction in cutting force. The mechanisms of tool force reduction in VAM are yet to be clarified. Improvement in tool life and surface finish are obtained in precision machining through decreasing the ratio of Vup/Vc, Vup represents upfeed velocity of the workpiece relative to the tool, and Vc, the critical velocity of vibration of the tool. Thus, with a 40 kHz frequency of vibration and an amplitude of 4 µm, the critical velocity of vibration (Vc)=1 m/s. Since Vup is designed to operate at one tenth of Vc, the critical velocity of vibration of the tool, Vup is 0.1 m/s or 10 cm/s. The measured cutting force is about 0.04N when machining stainless steel with a polycrystalline diamond tool. Thus, the cutting speed and feed used in precision machining with VAM are very low, compared to cutting speed and feed in high speed machining. The frequency of tool vibration used in VAM for precision machining is less than 40 kHz, mostly around 20 kHz in the prior art, which can be seen in patents for vibrating the cutting tool in this range. However, the present invention clearly shows that the frequency of vibration has to exceed the critical frequency of shear localization or chip segmentation, which is far higher than 20 kHz in high speed machining. The amplitude of vibration is very small, just adequate to break up the tool-chip atomic contact but the vibrational frequency has to be as high as possible, well above the critical frequency of shear localization or chip segmentation in high speed machining in order to prevent nanocrystalline grain boundary diffusion or oxidation wear mechanisms which cause accelerated chemical tool wear. The development of such a device for high frequency tool vibration required to suppress shear localization is technically feasible, considering that the frequencies of vibration currently used to generate ultrasound waves range from 1 to 10 MHz.

The foregoing example illustrates that extremely low cutting speeds and feeds are used in precision machining where the objective is to obtain excellent mirror-like surface finish. The chip morphology under these conditions of precision machining cutting are continuous flow chip and the tribological conditions are sliding with asperity contact obtained at low cutting speeds and feeds. In high speed machining used in automotive applications, the cutting speeds are two to three orders of magnitude greater than those applicable to precision machining, but the tool life in high speed machining is limited by accelerated chemical wear mechanisms.

Vibration assisted machining has been applied successfully in precision machining, using 1 dimensional or 2 dimensional vibration. In these cases, the focus was on bringing about interrupted cutting by ensuring the vibrational velocity of the tool exceeded the upfeed velocity of the workpiece motion relative to the tool, thereby causing the tool to separate from the workpiece. The actual time of cutting was kept small relative to non-cutting time when the tool is separated from the workpiece so that the average cutting force is small in relation to the peak cutting force during actual cutting. This concept is central to VAM applied to precision machining. Vibration is applied on an empirical basis at such low cutting speeds and feeds in combination with forced lubrication to promote sliding tribology and achieve excellent mirror-like surface finish. Moriwaki et al., supra, developed elliptical two dimensional vibration cutting technology, in which the vibration frequency was limited to 20 kHz and the cutting speed was limited to 5 m/min or less than 10 cm per s. Compared to the low feed and cutting speeds used in the prior art of vibration assisted machining, the cutting speeds used in high speed machining are typically from 100 to 2000 m/min and the feeds are typically 50 micrometer and above. At high cutting speeds, there is significant temperature rise, which causes atomic diffusion, a thermally activated process that limits tool life. There is no input parameter in the prior art, relating tool wear to microstructure and its influence on dynamic behavior of the workpiece during metal cutting. But at high cutting speeds, microstructural parameters of the workpiece influence chip morphology through shear localization or segmentation occurring in the primary shear zone. As a consequence, accelerated chemical tool wear is caused by either nanocrystalline grain boundary diffusion or oxidation mechanisms.

The prevention of accelerated chemical tool wear caused by shear localization or segmentation of chips in the primary shear zone is central to the instant invention. However, chemical tool wear occurring at the cutting edge of the tool at higher cutting speed can only be suppressed if the vibration frequency imposed externally exceeds the critical frequency of shear localization or chip segmentation in the primary shear zone. The amplitude of vibration required to prevent shear localization should be just adequate to break the tool-chip atomic contact. But the interruption of cutting, causing the breaking of the atomic contact, should occur before the onset of shear localization or chip segmentation in the periodic cycle of shear localization or chip segmentation in the primary shear zone in the absence of vibration. The technological implication is that the frequency of vibration should exceed the frequency of shear localization or chip segmentation, which, in turn, is related to the dynamic behavior of the workpiece material under large strain, high strain rate deformation imposed by metal cutting variables like cutting speed and feed. In accordance with the present invention, the critical frequency of shear localization or segmentation of the chip is a measurable parameter that is related to dynamic behavior of the workpiece material under large strain, high strain rate deformation at high temperature and pressure imposed by cutting speed, feed and tool geometry in metal cutting. Mechanisms of accelerated chemical tool wear in high speed machining, in turn, are related to nanocrystalline grain boundary diffusion associated with shear localization in the primary shear zone or oxidation wear mechanism associated with chip segmentation. The method of the present invention comprising suppressing accelerated chemical tool wear in high speed machining is based on interrupting the tool-chip atomic contact by vibrating the tool at a frequency higher than the critical frequency of shear localization or segmentation of the chip, thereby preventing the occurrence of shear localized or segmented chip morphology.

Phenomenological observations on chips from different workpiece materials over a wide range of cutting conditions led to the discovery that shear localization in the primary shear zone can be influenced by varying the atomic contact length at the tool-chip interface during the stick period of the stick-slip cycle of shear localized chip morphology. The strategy is to reduce the contact length at the tool-chip interface by reducing the stick period for atomic contact in the stick-slip cycle of chip traverse over the tool, by vibration of the tool and/or workpiece to interrupt the atomic contact. The present invention is based, in part, on suppression of nanocrystalline layer formation in the primary shear zone and hence minimization of chemical tool wear through control of contact length at the tool-chip interface.

The contact length increases during the stick cycle and decreases during the slip cycle, which causes periodic variation in chip thickness, cutting force and shear angle. If critical shear angle for dynamic recrystallisation in the primary shear zone is reached during the stick cycle, nanocrystalline grains will occur in the primary shear zone. It was discovered that the occurrence of nanocrystalline grains due to shear localization in the primary shear zone caused accelerated chemical wear at the cutting edge of the tool. Thus, the prevention of nanocrystalline grains in the interfacial layer at the tool-chip interface, where the primary shear zone interacts with the cutting edge of the tool is essential to prevent chemical tool wear localized at the cutting edge of the tool.

The formation of nanocrystalline grains due to shear localization in the primary shear zone can be prevented by reducing the contact time through vibration of the tool and/or workpiece below the threshold required to cause shear localization in the primary shear zone. The key concept is that the time of atomic contact and hence, the contact length can be controlled by vibration frequency of the tool and/or the workpiece to cause separation of the tool from the workpiece to interrupt the cutting. The basic concept is to decrease the atomic contact time during the stick period of the stick-slip periodic cycle through vibration of the tool and/or workpiece, thereby controlling the atomic contact length well below the threshold required for shear localization in the primary shear zone to occur. The critical stick time required to promote shear localization can be independently determined by monitoring acoustic or ultrasonic signals associated with a shear localization event or from metallographic characterization of the chip.

FIG. 8 is a schematic of chip morphology evolution as influenced by a stick-slip event occurring at the tool-chip interface. The tool-chip atomic contact length increases during the stick period of the stick-slip cycle of chip formation. In consequence, the chip thickness increases and the shear angle decreases. However, before the equilibrium shear angle can be reached to form flow chip morphology, a microstructural softening event intervenes to form a shear localized chip morphology. Nanocrystalline grains are formed by shear localization in the primary shear zone, which interact with the cutting edge of the tool to cause accelerated chemical tool wear. By interrupting the tool-chip contact by vibration of the tool and/or workpiece, shear plane rotation is arrested well before the onset of shear localization in the primary shear zone, thereby preventing shear localization in the primary shear zone. Thus, vibration of the tool and/or workpiece reduces the thickness of the chip and raises the shear angle well above the threshold for the occurrence of shear localization in the primary shear zone. The prevention of nanocrystalline grain formation associated with shear localization suppresses accelerated chemical tool wear at the cutting edge of the tool due to nanocrystalline grain boundary diffusion.

FIG. 9 illustrates the origin of shear localized chip morphology in a Fe-18.9% Ni-0.1% C alloy due to microstructural softening caused by martensite to austenite phase transformation interrupting shear plane rotation before rotating to an equilibrium shear angle for flow chip morphology during machining hardened iron nickel model alloy at a cutting speed of 350 m/min Flow chip morphology in metal cutting is based on sliding tribology at the tool-chip interface, which is the ideal case. Under conditions of atomic contact at the tool-chip interface or the tribological conditions of seizure, accelerated chemical tool wear is caused by nanocrystalline grain boundary diffusion in the white layer due to shear localization. Shear localization in the secondary shear zone causes chemical crater wear, which is located at some distance from the cutting edge. But shear localization in the primary shear zone causes the loss of cutting edge. By controlling the time of tool-chip atomic contact through vibration, it is possible to suppress shear localization in the primary shear zone. By controlling the tool-chip atomic contact time during the stick period, it is possible to control the atomic contact length. When the tool is not in atomic contact with the chip, external lubrication can be applied, which has the beneficial effect of promoting sliding tribology.

FIG. 10 illustrates the effect of controlling the atomic contact time and contact length by vibration of the tool and/or workpiece on chip thickness in comparison with sliding tribology. Tool-chip atomic contact increases the thickness of chip and decreases shear angle. The key step is to interrupt the tool-chip atomic contact by vibration before the onset of shear localization in the primary shear zone. By interrupting atomic contact through vibration of the tool and/or workpiece, chip thickness is decreased and the shear angle is increased. While the present invention is described for control of tribology at the tool-chip interface by vibration of the tool and/or workpiece to control the atomic contact time and atomic contact length, the scope of the invention is not limited to this specific application of metal cutting but includes all other applications of working metals and materials where control of atomic contact time and contact length by vibration is used as a means to control the tribological condition of atomic contact at the tool-workpiece interface.

This invention, in another aspect, is based on the critical relationship between the externally imposed frequency of vibration of the tool and/or workpiece to some "critical frequency" characteristic of the machined part based on onset of nanocrystalline grain formation near or at the surface. This critical frequency can be determined experimentally by metallographic techniques by characterizing the wave length of shear localization on the chip or stick-slip features on the underside of the chip with the aid of a scanning electron microscope or by on-line acoustic or ultrasonic measurements for the surface material being machined for a set of machining conditions such as machine feed rate, cutting speed, and the like. In accordance with the present invention, it has been determined that the critical frequency of vibration to suppress chemical tool wear due to nanocrystalline formation should exceed the frequency of shear localization in the primary shear zone in the absence of tool vibration thereby controlling the tool-chip atomic contact time and should be far less than the atomic contact time for shear localization due to microstructural softening during the stick period of the stick-slip periodic cycle of shear localized chip formation. The amplitude of vibration of the tool and/or workpiece is defined as that required to break up the tool-chip atomic contact. Thus, nanocrystalline grain formation in the primary shear zone associated with white layer formation in the chip can be suppressed by controlling the tool-chip atomic contact time and hence the atomic contact length by vibrating the tool and/or the workpiece with an amplitude sufficient to break up the tool-chip atomic contact before the onset of shear localization in the primary shear zone due to microstructural softening during the stick period of the slip-stick period of chip formation.

FIG. 2 shows that tool degradation at the cutting edge is minimized by eliminating nanocrystalline grain formation associated with the white layer due to shear localization in the primary shear zone and FIG. 7 provides a quantitative measure of the critical frequency for vibration to prevent the onset of shear localization in the primary shear zone.

With the increase in the ratio of frequency of tool vibration over the frequency of shear localization, shear localization in the primary shear zone is prevented and the consequent accelerated chemical tool wear due to nanocrystalline grain formation is suppressed. The effect of protecting the cutting edge from chemical wear is to improve the surface finish. By decreasing the thermal softening potential of the workpiece by prior heating of the surface layers to be machined by laser preheating or induction heating, it is possible to decrease the frequency of shear localization in the primary shear zone and hence decrease the critical frequency of vibration of the tool and/or workpiece to suppress shear localization in the primary shear zone. Laser ultrasonics can be used to vibrate the tool and/or workpiece.

If the metal matrix is dispersed with a large volume fraction of non-metallic second phase particles, incompatibility of deformation between the second phase particles and the metal matrix gives rise to void nucleation, void growth and coalescence, allowing fracture to dominate over plastic deformation. In consequence, shear localized chip morphology gives way to segmented chip morphology. Whereas hardened steel exhibits shear localized chip morphology with characteristic white layer formation in the primary shear zone, cast iron exhibits segmented chip morphology.

Recent work on Environmental Scanning Electron Microscope (ESEM) videoing of ductile iron machining in-situ shows clearly that the cutting edge of the tool is exposed to air during the segmentation of the chip. The video images show the evolution of segmented chip morphology during orthogonal cutting of ductile iron. Incompatibility of deformation between deformed graphite spheroids and the metal matrix causes void nucleation by decohesion at the graphite/metal interface. Void nucleation, void growth and void coalescence culminates in crack initiation, which grows from the free surface to the cutting surface of the tool, exposing air from the free surface of the chip to the cutting edge of the tool to cause oxidation of the tool.

FIG. 11a, FIG. 11b, and FIG. 11c are photographs taken in sequence from SEM images of segmented chip morphology evolution in cutting ductile iron, which show crack formation, extending from the free surface of the chip to the cutting edge and rake face of the tool respectively. The temperature of the tool is raised by heat from work of deformation in chip formation. The periodic occurrence of cracks associated with segmented chip morphology exposes the cutting edge of the tool at high temperature to oxygen in the surrounding air, which causes oxidation wear of a PCBN tool.

Oxidation of a PCBN tool is aided by chip segmentation, which exposes the tool surface at high temperature to air, causing oxidation wear. For example, gray cast iron exhibits low strain to fracture because of its large volume fraction of graphite. The incompatibility of deformation between the metal matrix and graphite flakes causes void nucleation, growth and coalescence. Vibrating the tool and/or workpiece above the critical frequency of chip segmentation in accordance with the present invention can prevent the segmentation of the chip, thereby preventing ingress of oxygen to the heated tool surface to cause oxidation wear. Forced lubrication can be applied to lubricate the tool-chip interface when the tool is separated from the workpiece during vibration of the tool. This helps to prevent ingress of oxygen to the tool-chip interface, while promoting sliding tribology at the tool-chip interface.

In high speed finish machining, high cutting speed is required to meet the productivity requirements in automated lines in finish machining, but the low feed is essential in order to meet the surface finish criterion. In high speed machining, accelerated chemical tool wear is still an outstanding problem.

(1) Based on a quantitative analysis of observations on chip morphology, the nano-structure of the interfacial layer at the tool-chip contact, the depth profile of the concentration gradient of solutes in the interfacial layer, stick-slip features of chips and consequent tool wear at varying cutting speeds and feeds in different workpiece materials with and without second phase particles dispersed in metal matrix in the hardened and unhardened condition, it has now been discovered that accelerated chemical tool wear is caused by two competing mechanisms: (i) dissolution of the tool into the chip caused by enhanced nanocrystalline grain boundary diffusion, and (ii) oxidation of the tool.

(2) Nanocrystalline grains associated with shear localization in the primary shear zone cause accelerated chemical dissolution wear localized at the cutting edge of the tool. Nanocrystalline grains occur at three potential locations of tool-chip or workpiece contact: (i) shear localization in the secondary shear zone at the tool-chip contact causing nanocrystalline grain formation, which, in turn, causes accelerated chemical crater wear localized on the rake face of the tool, (ii) shear localization in the primary shear zone giving rise to nanocrystalline grain formation in the primary shear zone, causing accelerated chemical tool wear localized at the cutting edge of the tool, caused by accelerated dissolution of the cutting edge of the tool into nanocrystalline grain boundaries in the primary shear zone, resulting in the loss of cutting edge of the tool and formation of a flank wear land, and (iii) shear localization on the machined surface by interaction of the flank wear land with the machined surface of the tool, causing the formation of nanocrystalline grains on the machined surface, thereby causing accelerated chemical flank tool wear due to the nanocrystalline grain boundary diffusion of the tool material on the machined surface. The mechanism of accelerated chemical wear at the cutting edge of the tool is caused by high diffusivity paths associated with nanocrystalline grain boundaries in the primary shear zone. Hence the prevention of nanocrystalline grains associated with the shear localization event is the key to improved tool life, as in high speed machining of hardened steel. In machining materials with low strain to fracture, accelerated chemical tool wear is caused by an oxidation wear mechanism, when the heated surface layer of the tool is exposed to oxygen ingress through cracks arising from the chip segmentation process. Hence the prevention of segmentation in the primary shear zone of the chip is the key to suppress accelerated chemical tool wear due to oxidation mechanism, as in high speed machining of cast iron.

(3) The present invention has, as one objective, preventing shear localization or chip segmentation occurring in the primary shear zone, thereby preventing accelerated chemical tool wear. It has been discovered that the critical frequency of shear localization or segmentation occurring in the chip is dependent on workpiece microstructure and is related to the cycle time the chip is in atomic contact with the tool for the critical atomic contact length to be reached before shear localization or chip segmentation occurs in the primary shear zone. According to the present invention, shear localization or chip segmentation in the primary shear zone can be prevented by vibrating the tool to interrupt the tool-chip atomic contact before the critical contact length for shear localization or chip segmentation is reached. This is achieved by vibrating the tool at a frequency greater than the critical frequency of shear localization or chip segmentation, which can be measured on-line by ultrasonic sensors or off-line metallographically and is generally above at least about 50 kHz. In a preferred embodiment of the present invention, the frequency of vibration ranges from about 50 kHz to about 10 MHz.

Microstructural parameters of the workpiece influence critical contact length and hence the critical frequency of shear localization or chip segmentation. The critical contact length is governed by thermal softening potential of the matrix microstructure and volume fraction of second phase particles. By annealing or prior thermal softening of the workpiece, the thermal softening potential of workpiece is decreased and the critical contact length is increased. By decreasing the size and amount of second phase particles, the critical contact length for chip segmentation is increased. Grey cast iron with interconnected graphite morphology exhibits low strain to fracture and is associated with low critical contact length for chip segmentation. In ductile iron, graphite spheroids are separated from one another with intervening metal matrix, which increases the critical contact length for chip segmentation. Thus the workpiece microstructure determines the critical contact length, which is the controlling target parameter to be reached in metal cutting in order to promote shear localization or segmentation in the primary shear zone. Hardening the matrix and loading with second particles decreases the critical contact length, which promotes shear localization. The critical contact length can be increased and hence the critical frequency for shear localization can be decreased by thermal softening the workpiece microstructure through preheating the workpiece by laser or induction heating techniques, which are beneficial for increased tool life.

In the case of a steel workpiece, glassy oxide inclusions can be engineered into the workpiece, which self lubricate the tool-chip interface, thereby promoting sliding tribology at the tool-chip contact. Deformable MnS inclusions can be engineered into the workpiece, which can act as a diffusion barrier at the tool-chip contact. However, the incompatibility of deformation between MnS and the metal matrix will decrease the critical strain to fracture, thereby promoting the chip segmentation frequency. It is beneficial to design tool materials or coatings that are resistant to oxidation wear. Diffusional wear can be minimized by selecting the material for the tool or coating the tool surface, which has a minimum dissolution potential in the workpiece.

Cutting speed, feed and tool geometry are important metal cutting variables that influence shear localization or chip segmentation. Cutting speed and feed are identified as two key processing parameters in metal cutting that determine whether the critical contact length in a given workpiece material can be reached to cause shear localized or segmented chip morphology. Increasing the cutting speed and feed increases the contact length. The cutting geometry of the tool is another important variable that determines the state of stress in metal cutting that influences chip fracture behavior. Nanocrystalline grains are formed by large strain, high strain rate deformation in the shear localized region at high temperature under large pressure. At a constant feed, the effect of increasing the cutting speed is to increase the contact length above the threshold for shear localization or chip segmentation. Similarly, at a constant cutting speed, the effect of increasing the feed is to increase the contact length above the critical contact length for shear localization or chip segmentation. At high cutting speed, the critical frequency of shear localization or chip segmentation increases, and therefore the frequency of tool vibration to interrupt cutting within the critical cycle time of shear localization or chip segmentation is correspondingly increased, well beyond the reach of currently available equipment for vibration assisted cutting, which are designed for precision machining and which operate at low cutting speed and low feed.

In high speed machining of industrial alloys, the critical frequency of shear localization or chip segmentation is high, typically well above 40 kHz, which requires the vibrational frequency of the tool to range from about 50 kHz to about 10 MHz (although the prior art of vibration assisted machining for precision machining was limited to 40 kHz or below, mostly under 20 kHz, the recent advances in piezoelectric materials and design have rendered it feasible to attain such high frequencies of vibration of the tool). The second condition is that at high cutting speeds, the vibration velocity of the tool must exceed the upfeed velocity of the workpiece in order to bring about tool-workpiece separation during cutting and to interrupt the cutting at the required stage to suppress shear localization or chip segmentation. The vibration velocity of the tool at an amplitude of 15 µm and a frequency of 500 kHz is 47.1 m/s or 2826 m/min, which is well above the typical cutting speed in high speed machining. The same vibrational velocity can be achieved by increasing the frequency of vibration to 5 MHz and decreasing the amplitude to 1.5 µm Thus, by selecting the appropriate frequency and amplitude of vibration, it is feasible to bring about tool-chip separation at high cutting speeds, typical of high speed machining.

The currently available commercial equipment for ultrasonic vibration of a cutting tool developed for precision machining are designed to operate at a frequency less than 40 kHz. (S. Mishiro et al., U.S. Pat. No. 4,911,044). The range of frequency of tool vibration in the equipment currently available in the market is inadequate to suppress shear localization or chip segmentation from occurring in the primary shear zone at high cutting speeds and hence prevent chemical tool wear. Prior thermal softening of the workpiece surface layers by laser or induction heating techniques can be used to lower the critical frequency of shear localization or segmentation in the primary shear zone of the chip, which is one technological option to suppress accelerated chemical tool wear. However, the present invention clearly identifies the need to develop devices to vibrate the tool at high frequency that exceeds the critical frequency of shear localization or segmentation in the primary shear zone of the chip in order to suppress mechanisms of accelerated chemical tool wear encountered in high speed machining of automotive components and difficult-to-machine aerospace alloys. The high frequency and low amplitude of tool vibration required to suppress chemical tool wear in high speed machining are well within the technical capability of recent generation piezo-electric materials with capability to generate frequencies ranging from 20 kHz to 10 MHz.

The following examples further illustrate the present invention. The examples are solely intended for the purpose of illustration of the present invention and should not be construed in limitation of the present invention.

The following are examples of the calculation of the frequency of vibration required to suppress shear localization or chip segmentation in high speed machining in order to prevent accelerated chemical tool wear:

EXAMPLE 1

High speed machining of grey cast iron with pearlitic matrix—an example of chip segmentation Chip morphology obtained in high speed finish machining of gray iron rotors is given in FIG. 12.

Cutting speed=2194 m/min or 36.56 m/s

Feed: 0.15 mm

Critical contact length for segmentation of chip (from micrograph in FIG. 12)=0.1 mm Minimum chip thickness=0.17 mm Maximum thickness of chip at the time of segmentation=0.275 mm Feed/Chip thickness ratio at segmentation=0.15/0.275=0.545

The chip velocity decreases with the increase in chip thickness.

The chip velocity starts off at 32.25 m/s and decreases to 19.92 m/s at the time of segmentation.

Critical frequency of chip segmentation based on an average chip velocity of $26(26.08)$ m/s=$26 \times 10^3$ mm/0.1 mm=260 kHz Frequency of tool vibration should exceed 260 kHz in order to suppress segmentation of the chip in the primary shear zone. Hence, a tool vibration frequency of 500 kHz is chosen, which is adequate to suppress segmentation of chip in the primary shear zone.

The target contact length of tool-chip separation at 500 kHz is 0.052 mm.

For a tool vibration frequency of 500 kHz, an amplitude of 15 µm is selected so that vibrating velocity of the tool (47.1 m/s) is greater than the workpiece velocity at cutting (36.56 m/s), in order to ensure tool-workpiece separation for interrupting tool-chip atomic contact during high speed machining. The same procedure is employed in the following examples.

EXAMPLE 2

Quenched and tempered 4340 steel microstructure—an example of hardened steel matrix, exhibiting shear localization characterized by white layer formation. TEM characterisation has revealed that the white layer comprises nanocrystalline grains.

Calculation of frequency of vibration required to suppress shear localization in the primary shear zone in quenched and tempered 4340 steel at a cutting speed of 300 m/min and a feed of 0.05 mm:

The optical metallographic picture of a typical chip obtained from orthogonal cutting of hardened 4340 steel at a cutting speed of 300 m/min and a feed of 0.05 mm is given in FIG. 13.

Critical contact length for shear localization in primary shear zone=60 µm

The maximum thickness of the chip=120 µm

The minimum thickness of the chip=35 µm

The average chip thickness=77.5 µm

The velocity of chip at shear localization=2.08 m/min

The average velocity of the chip=5×(50/77.5)=3.225 m/s

Critical frequency of shear localization based on average chip velocity=53.75 kHz Critical frequency of shear localization can be more precisely measured by on-line sensors.

Target contact length to suppress shear localization by vibration=30 µm

Frequency of vibration required to achieve target contact length to suppress shear localization in the primary shear zone=107.5 kHz For an amplitude of 15 μm, the vibrating tool velocity at a frequency of 107.5 kHz is 10.12 m/s, which is greater than the cutting velocity of 5 m/s in order to ensure tool-workpiece separation.

EXAMPLE 3

Turning of compacted graphite iron at a cutting speed of 800 m/min and feed of 0.1 mm—an example of accelerated chemical wear due to nanocrystalline grain formation due to shear localisation and oxidation wear due to chip segmentation.

An SEM micrograph of a chip from machining compacted graphite iron at a cutting speed of 800 m/min and a feed of 0.1 mm is given in FIG. 14.

Cutting speed of 800 m/min and feed of 0.1 mm are representative of line speed and feed of the cylinder boring operation.

Chip morphology exhibits shear localisation associated with nanocrystalline grains in the primary and secondary shear zone followed by segmentation.

Cutting speed=800 m/min or 13.33 m/s

Feed=0.1 mm

Critical contact length for segmentation of chip=0.05 mm

Minimum chip thickness=0.06 mm

Maximum thickness of chip at the time of segmentation=0.12 mm

The chip velocity decreases with the increase in chip thickness.

The chip velocity starts off at 11.11 m/s and decreases to 5.554 m/s at the time of segmentation.

Critical frequency of chip segmentation based on an average chip velocity of 8.332 m/s=8.332×10³ mm/0.05 mm=166.6 kHz Target contact length=0.025 mm Tool vibration frequency to attain target contact length of 0.025 mm=333 kHz.

For a tool vibration frequency of 333 kHz, an amplitude of 15 μm is selected so that vibrating velocity of the tool (20.91 m/s) is greater than the workpiece velocity at cutting (13.33 m/s), in order to ensure tool-workpiece separation for interrupting tool-chip atomic contact to prevent shear localisation and segmentation in the primary shear zone, both of which cause accelerated chemical tool wear.

EXAMPLE 4

High speed machining of hardened model alloy Fe-28% Ni-0.1% C alloy

Cutting speed=400 m/min or 6.666 m/s

Feed=0.1 mm

Optical microstructure is given in FIG. 15, showing white band due to shear localisation due to reverse martensite to austenite transformation Chip thickness at the start of new cycle=0.15 mm Maximum chip thickness at shear localzation due to phase transformation=0.22 mm Average chip velocity=6.666*(0.1/0.185)=3.6 m/s Critical contact length=0.07 mm Critical frequency of shear localization in the primary shear zone=51.42 kHz Target contact length chosen to suppress shear localization=0.035 mm Frequency of vibration based on target contact length=102.8 kHz For an amplitude of tool vibration of 15 μm, tool vibrating velocity is 9.68 m/s, which is greater than cutting velocity of workpiece of 5 m/s in order to ensure tool-workpiece separation. By reducing the target contact length to 0.007 mm, the frequency of vibration is increased to 514.2 kHz, and the amplitude can be decreased to 3 μm to achieve the same tool vibrational velocity of 9.68 m/s. The technological implication is that with higher frequency, the contact length can be decreased to yield thinner chip. The vibrating velocity of the tool is increased with increase in frequency, which can be offset by decreasing the amplitude of vibration.

EXAMPLE 5

Austempered ductile iron

Cutting speed=800 m/min or 13.33 m./s

Feed=0.05 mm

Minimum chip thickness=30 μm

Maximum chip thickness=81.5 μm

Critical contact length=55 μm. See optional micrograph of chip in FIG. 16

Average chip velocity=13.55*(50/56)=12 m/s

Critical Frequency of shear localization=218 kHz

Target contact length=30 μm

Frequency of vibration required to suppress shear localization=451.6 kHz

If the amplitude of vibration is 10 μm, the velocity of vibrating tool will be 28.36 m/s, which is greater than velocity of workpiece (13.33 m/s) in cutting in order to achieve tool-workpiece separation The effect of a hardened iron matrix in austempered ductile iron is to promote shear localization in spite of a large volume fraction of graphite. By comparison, ferritic ductile iron exhibits fully segmented chip with low critical frequency of chip segmentation. These materials tend to exhibit high critical frequency of shear localization. Consequently, vibration frequency to suppress shear localization is high, which is the thrust of the instant invention.

The microstructure of the chip permits extraction of information on the critical contact length and chip thickness variation. From the chip thickness variation, the average chip velocity can be determined. Average chip velocity and critical contact length for shear localization or segmentation are used in the foregoing examples to determine critical frequency of shear localization or chip segmentation, $F_{crit}$. More precise evaluation of $F_{crit}$, the critical frequency of segmentation or chip segmentation is possible by processing signals acquired on-line by ultra-sonic sensors during metal cutting.

In order to prevent shear localization or segmentation in the primary shear zone, the time evolution of tool-chip atomic contact length during each periodic cycle has to be interrupted before the critical contact length is reached for the onset of shear localization or chip segmentation. The interruption of atomic contact should occur at the target contact length, which is a fraction of the critical contact length and hence the frequency of tool-workpiece interruption should be greater than the critical frequency of shear localization. In other words, frequency of vibration of the tool, $F_{vib}$ has to be greater than the critical frequency of shear localization, $F_{crit}$ in order to intervene during the evolution of contact length before shear localization or chip segmentation would occur.

$$F_{vib}=xF_{crit}, \text{ where } x>1 \qquad \text{(First condition)}$$

The frequency of tool-workpiece interruption required to suppress shear localization is translated into a frequency of vibration required of the tool. According to the present invention, the frequency of tool vibration has to exceed the critical frequency of shear localization or chip segmentation in order to suppress shear localization.

In order to bring about tool-workpiece separation, the tool has to move faster than the moving workpiece, $V_{cutting}$. This is another consideration. This requires that the vibrating velocity of the tool, $V_{vib}$ must be greater than the cutting velocity of the workpiece, $V_{cutting}$ $$V_{vib} > V_{cutting}$$

$$V_{vib} = y V_{cutting}, \text{ where } y > 1 \quad \text{(Second condition)}$$

$$V_{vib} = 2\pi F_{vib} A_{vib}, \text{ where}$$

$F_{vib}$ the vibration frequency of the tool
$A_{vib}$ the amplitude of vibrating tool
Thus, $V_{vib} = 2\pi F_{vib} A_{vib} = y V_{cutting}$
But to prevent shear localization, $F_{vib} = x F_{crit}$
Hence, the condition for interrupting tool-chip atomic contact to prevent shear localization or chip segmentation is given by coupling the above two conditions $$V_{vib} = 2\pi (x F_{crit}) A_{vib} = y V_{cutting}.$$

The resulting equation defines the amplitude of tool vibration.

The amplitude of vibration has to be adequate to break the tool-chip atomic contact, which requirement is easily met even at very high frequency.

$$A_{vib} = (y V_{cutting})/2\pi (x F_{crit})$$

Assigning x and y each a value of 2, $A_{vib}$ can be calculated for a cutting speed of 15 m/s and critical frequency of shear localization or chip segmentation, $F_{crit} = 200$ kHz.

$$A_{vib} = (y V_{cutting})/2\pi (x F_{crit})$$

$$A_{vib} = 2 \times 15 \times 10^6 / 2 \times 3.14 \times 2 \times 200,000$$

$$Avib = 23.88 \, \mu m.$$

The forgoing analysis shows clearly that capturing the microstructural input through Fcrit, the critical frequency of shear localization or chip segmentation is central to setting up the parameters for frequency and amplitude of vibration of the tool required to suppress shear localization or chip segmentation in the chip and hence prevent accelerated chemical tool wear.

$F_{crit}$ can be measured by processing signals acquired on-line by ultra-sonic sensors during metal cutting and displayed digitally. Based on the assignment of x and y, Fvib and Avib can be determined. $F_{crit}$ is influenced by the dynamic behavior of the workpiece, tool geometry, cutting speed and feed, all of which influence chip morphology and its microstructure. $F_{crit}$ is a strong function of matrix hardening and volume fraction of second phase particles in the workpiece microstructure. The foregoing examples are drawn from a wide range of microstructures of engineering interest. In each case, accelerated chemical tool wear is still an outstanding problem, which the present invention is aimed at preventing.

While the invention has been particularly shown and described with reference to various embodiments, it will be understood by those skilled in the art that modifications and changes can be made to the present invention without departing from its scope. For example, although the foregoing examples illustrate the use of vibrational frequencies ranging from about 100 to 500 kHz, it is readily apparent the higher or lower frequencies can be employed depending on microstructure and machining conditions.

The invention claimed is:

1. A process for high speed machining of workpiece materials using high performance tools comprising vibrating the tool and/or the workpiece at a frequency greater than that which causes shear localization in the primary shear zone or chip segmentation in the absence of tool vibration, thereby suppressing shear localization or chip segmentation in the primary shear zone, wherein the tool and/or workpiece is vibrated at a vibrational frequency ranging from about 50 kHz to about 10 Mhz, wherein the frequency of vibration of the tool and/or workpiece is controlled by processing signals from acoustic and ultrasonic sensors on-line or from off-line metallographic characterization.

2. The process of claim 1, further comprising use of a vibrational frequency having an amplitude sufficient to break up the tool-chip atomic contact.

3. The process of claim 1, wherein the vibration of the tool and/or workpiece suppresses chip segmentation, thereby preventing oxidation wear of the tool.

4. The process of claim 1, wherein vibration of the tool and/or workpiece suppresses chemical tool wear due to nanocrystalline grain boundary diffusion in the primary shear zone of a chip.

5. The process of claim 1, wherein vibration of the tool and/or workpiece suppresses accelerated chemical wear caused by shear localization in the primary shear zone associated with nanocrystalline grain formation in a workpiece material exhibiting a transformation band thereby prolonging tool life.

6. The process of claim 1, wherein vibration of the tool and/or workpiece suppresses accelerated chemical wear caused by shear localization in the primary shear zone associated with nanocrystalline grain formation in a workpiece material exhibiting an untransformed deformation band, thereby prolonging tool life.

7. The process of claim 1 wherein vibrating the tool and/or workpiece at a frequency greater than that which causes chip segmentation, prevents ingress of oxygen through formation of cracks in the segmented chip.

8. The process of claim 1, wherein vibrating the tool and/or workpiece at a frequency greater than that which causes chip segmentation, prevents accelerated chemical wear in the tool.

9. The process of claim 1, wherein the nanotribology at the tool-chip interface is controlled by external lubrication during the period of vibration when the tool is not in atomic contact with the chip, thereby promoting sliding tribology and suppressing chemical crater wear from atomic contact at the tool-chip interface.

10. A process for high speed machining of workpiece materials using high performance tools comprising vibrating the tool and/or the workpiece at a frequency greater than that which causes shear localization in the primary shear zone or chip segmentation in the absence of tool vibration, thereby suppressing shear localization or chip segmentation in the primary shear zone, wherein the tool and/or workpiece is vibrated at a vibrational frequency ranging from about 50 kHz to about 10 Mhz, wherein the workpiece is pre-heated by laser or induction heating on line in addition to tool vibration to decrease the frequency of shear localization in the primary shear zone.

11. A process for high speed machining of workpiece materials using high performance tools comprising vibrating the tool and/or the workpiece at a frequency greater than that which causes shear localization in the primary shear zone or chip segmentation in the absence of tool vibration, thereby suppressing shear localization or chip segmentation in the primary shear zone, wherein the tool and/or workpiece is vibrated at a vibrational frequency ranging from about 50 kHz to about 10 Mhz, wherein vibration of the tool and/or workpiece is combined with coating of the tool to minimize chemical crater wear.

12. The process of claim 1, wherein the workpiece provides self-lubrication.

13. The process of claim 1, wherein the materials machined are selected from the group consisting of cast irons, grey, compacted and ductile iron, austempered ductile iron, and steels, both low and high alloy steels, and non-ferrous metals and alloys in the as-cast, wrought and heat treated condition.

14. The process of claim 1, wherein the tool is manufactured from a material selected from the group consisting of polycrystalline cubic boron nitride material, silicon nitride, Si—Al—O—N, diamond and diamond-like materials, cemented carbides, ceramics and cermets.

15. The process of claim 1, wherein vibration of the tool-chip interface is effected over a range of cutting speeds from 1 to 50 m/s.

16. The process of claim 1, wherein the workpiece is manufactured with glassy inclusions to lubricate the tool-chip interface in-situ to prevent shear localization in the primary shear zone.

17. The process of claim 1, wherein the workpiece is manufactured with deformable non-metallic inclusions which include oxides, sulfides, selenides and metallic inclusions which prevent atomic contact between the tool and the workpiece.

18. The process of claim 1, wherein oxidation at the tool-chip interface during the intermittent contact effected by vibration is substantially precluded in-situ by using elements or compounds with high affinity for oxygen in the workpiece or the tool so as to prevent chemical degradation of the tool by oxidation.

19. A process for high speed of workpiece materials using high performance tools comprising vibrating the tool and/or the workpiece at a frequency greater than that which causes shear localization in the primary shear zone or chip segmentation in the absence of tool vibration, thereby suppressing shear localization or chip segmentation in the primary shear zone, wherein the tool and/or workpiece is vibrated at a vibrational frequency ranging from about 50 kHz to about 10 Mhz, wherein oxidation at the tool-chip interface during the intermittent contact effected by vibration is substantially precluded by enveloping the tool-chip interface in a protective gaseous atmosphere.

20. A process for high speed machining of workpiece materials using high performance tools comprising vibrating the tool and/or the workpiece at a frequency greater than that which causes shear localization in the primary shear zone or chip segmentation in the absence of tool vibration, thereby suppressing shear localization or chip segmentation in the primary shear zone, wherein the tool and/or workpiece is vibrated at a vibrational frequency ranging from about 50 kHz to about 10 Mhz, wherein vibration of the tool and/or workpiece is used for control of tribology at the tool-chip atomic contact interface by controlling tool-chip atomic contact length and atomic contact time.

21. The process of claim 1, wherein the tool and/or workpiece is vibrated with an amplitude sufficient to break tool-chip atomic contact, the amplitude of vibration ranging from about 1 to 50 micrometers.

* * * * *